United States Patent
Kitabayashi

(10) Patent No.: US 6,923,545 B2
(45) Date of Patent: Aug. 2, 2005

(54) METHOD FOR MANUFACTURING COLOR COMBINING OPTICAL SYSTEM, APPARATUS FOR MANUFACTURING COLOR COMBINING OPTICAL SYSTEM AND METHOD FOR MANUFACTURING PROJECTOR

(75) Inventor: Masashi Kitabayashi, Hoigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 321 days.

(21) Appl. No.: 10/384,747

(22) Filed: Mar. 11, 2003

(65) Prior Publication Data

US 2003/0218802 A1 Nov. 27, 2003

(30) Foreign Application Priority Data

Mar. 14, 2002 (JP) ........................................ 2002-070968
Jan. 22, 2003 (JP) ........................................ 2003-013170

(51) Int. Cl.[7] ................ G03B 21/00; G03B 21/26; G03B 21/28; G02B 21/14; H04N 9/07
(52) U.S. Cl. ........................ 353/33; 353/34; 353/81; 353/82; 359/349; 359/634; 348/338
(58) Field of Search .............................. 353/81, 31, 33, 353/34, 37, 82, 98, 99, 122; 359/349, 443, 495, 618, 625, 629, 634, 636, 638–640; 348/336–339, 739, 744; 349/5, 7, 8

(56) References Cited

FOREIGN PATENT DOCUMENTS

JP        A 2000-221588        8/2000

*Primary Examiner*—Alan A. Mathews
*Assistant Examiner*—Rochelle Blackman
(74) *Attorney, Agent, or Firm*—Oliff & Berridge, PLC

(57) ABSTRACT

A measurement light (X) is introduced on either one of reflection surfaces (501, 502, 511, 512) to detect a returned light (Y) reflected by the reflection surfaces (501, 502, 511, 512), reflected by a reflecting device and again reflected by the reflection surfaces (501, 502, 511, 512) by an autocollimator (620) to conduct image-processing and calculation by a processor (628), where a position adjuster (690) adjusts an attitude of a cross dichroic prism (45) relative to a fixing plate (447) to eliminate deviation between a position of the measurement light (X) and the returned light (Y) based on the result of the processing, thereby producing a highly accurate prism unit (50).

13 Claims, 28 Drawing Sheets

METHOD FOR MANUFACTURING COLOR COMBINING OPTICAL SYSTEM, APPARATUS FOR MANUFACTURING COLOR COMBINING OPTICAL SYSTEM AND METHOD FOR MANUFACTURING PROJECTOR

BACKGROUND OF THE INVENTION

1. Field of the Invention

The present invention relates to a method for manufacturing color combining optical system, apparatus for manufacturing color combining optical system and method for manufacturing a projector.

2. Description of Related Art

Conventionally, a three-plate type projector having a color separating optical system for separating a light beam irradiated from a light source into three color lights of red, green and blue with a dichroic mirror, three optical modulators (liquid crystal panel) for modulating the separated light beams for every color lights in accordance with image information, and a color combining optical system for combining the light beam modulated by the respective liquid crystal panels has been known.

The color combining optical system has a fixed plate mechanically fixed to an optical component casing for housing the color separating optical system etc. and a cross dichroic prism as a color combining optical element adhered to the fixed plate, which is integrated as a prism unit (see Japanese Patent Laid-Open Patent Application No. 2000-221588).

The cross dichroic prism is a roughly cubic prism formed by combining and bonding four right-angle prisms along boundaries thereof. Three sides of the rough cube are light-incident side with the color light modulated by opposing liquid crystal panels incident thereon and the remaining one side is a light-irradiation side irradiating the composite light combining the incident light beams.

In the four bonding surfaces, a dielectric multi-layer film for reflecting red light of a predetermined wavelength band is provided on a pair of reflection surfaces stretching in one extending direction and another dielectric multi-layer film for reflecting blue light of other wavelength band different from the above wavelength band is provided on a pair of reflection surfaces stretching in the other extending direction. In other words, four reflection surfaces are disposed in the cross dichroic prism approximately roughly in X-shape. Accordingly, in order to obtain vivid projection image, the four reflection surfaces provided approximately roughly in X-shape have to be securely directed in a predetermined direction relative to the respective liquid crystal panels.

Accordingly, in a conventional arrangement, while viewing the cross dichroic prism from the upper side with a CCD camera etc., the outer profile of the cross dichroic prism is aligned with a reference line on the fixed plate, and planar position of the intersecting line formed by mutually abutting the edges of the respective right-angle prisms, i.e. the intersecting line of the reflection surface for reflecting the red light and the reflection surface for reflecting the blue light, is made consistent with the reference point of the fixed plate, thereby adjusting the position of the cross dichroic prism relative to the fixed plate.

However, according to the above method, since only the planar position of the cross dichroic prism relative to the fixed plate is adjusted with reference to the outer profile of the cross dichroic prism, the tilt of the cross dichroic prism cannot be accurately adjusted, thus causing unevenness on the accuracy of the produced prism unit. Accordingly, the yield rate of the prism unit is deteriorated, thus increasing production cost.

SUMMARY OF THE INVENTION

An object of the present invention is to provide a method for manufacturing color combining optical system, apparatus for manufacturing color combining optical system and method for manufacturing a projector capable of improving attachment accuracy of color combining optical element relative to the fixed plate and restraining production cost while enabling efficient manufacturing.

A producing method according to an aspect of the present invention is for producing a color combining optical system, the color combining optical system having: a color combining optical element that has four reflection surfaces arranged roughly in X-shape to form an incident angle of approximately forty-five degrees seen in a direction orthogonal to an optical axis of a plurality of incident light beams, the four reflection surfaces including one pair of reflection surfaces along one extending direction of roughly X-shape and the other pair of reflection surfaces along the other extending direction of roughly X-shape, the one pair of reflection surfaces reflecting a light beam of wavelength different from a light beam reflected by the other pair of reflection surfaces; and a fixing plate that is bonded on a side of the color combining optical element intersecting the reflection surfaces arranged roughly in X-shape, the method having: a reference position adjusting step where a position of an intersecting line of the one pair of reflection surfaces and the other pair of reflection surfaces is adjusted relative to a reference position set on the fixing plate; a rotary position adjusting step where a rotary position of the reflection surfaces is adjusted relative to the fixing plate around the intersecting line of which position is adjusted; a tilt adjusting step where a tilt of the reflection surfaces is adjusted relative to a bonding surface of the fixing plate; and a bonding step where the color combining optical element is bonded to the fixing plate after these adjusting steps are completed.

The bonding step may be conducted by inpouring fluid adhesive between the position-adjusted color combining optical element and the fixing plate. Alternatively, uncured and fluid light-curing adhesive may previously be provided between the color combining optical element and the fixing plate before position adjustment, and the light-curing adhesive may be cured after position adjusting step by irradiating light beam such as ultraviolet from above the color combining optical element.

According to the above arrangement, since the rotary position of the color combining optical element relative to the fixing plate can be adjusted during the rotary position adjusting step after adjusting the position of the color combining optical element relative to the reference position of the fixing plate during the reference position adjusting step, and since the tilt of the reflection surfaces of the color combining optical element can be adjusted during the tilt adjusting step, the attachment accuracy of the color combining optical element relative to the fixing plate can be improved as compared to an arrangement where the position is adjusted based on the planar position of the outer profile and intersecting line of the color combining optical element. Accordingly, dispersion of quality of the color combining optical system can be restrained, so that the color combining optical system can be efficiently produced with low production cost.

In the above method for manufacturing the color combining optical system, the reference position adjusting step may preferably be conducted by importing the image of the intersecting line to a computer through an image pickup device and an image importing device and processing the image by the computer.

In the above arrangement, an image pickup device such as CCD (Charge Coupled Device) and MOS (Metal Oxide Semiconductor) sensor and an image importing device such as video capturing board for converting the signal inputted by the image pickup device into image signal for a computer can be used.

By using the image pickup device and the image importing device, the intersecting line can be accurately and automatically aligned to the reference position of the fixing plate during the reference position adjusting step, thus further improving the attachment accuracy of the color combining optical element relative to the fixing plate.

In the above method for manufacturing the color combining optical system, the rotary position adjusting step may preferably have: a measurement light introducing step where a measurement light is introduced on one of the reflection surfaces of the color combining optical element at an incident angle of approximately forty-five degrees; a returned light detecting step where a returned light of the introduced measurement light is detected; and a reflection surface rotary position adjusting step where the rotary position of the one of the reflection surfaces is adjusted based on the detected returned light.

Further, the tilt adjusting step may preferably have: a measurement light introducing step where a measurement light is introduced on one of the reflection surfaces of the color combining optical element at an incident angle of approximately forty-five degrees; a returned light detecting step where a returned light of the introduced measurement light is detected; and a reflection surface tilt adjusting step where the tilt of the one of the reflection surfaces is adjusted based on the detected returned light.

According to the above arrangement, the measurement light is introduced on one of the reflection surfaces during the measurement light introducing step and, after the introduced measurement light is reflected by the reflection surface, the returned light reflected by a side of the color combining optical element and further reflected by the reflection surface is detected during the returned light introducing step. When the incident angle of the measurement light relative to the reflection surface is not arranged at forty-five degrees, the returned light is irradiated at a position different from the designed position of the introduced measurement light. Specifically, when the color combining optical element is shifted in rotary direction, the position of the measurement light and the position of the returned light are horizontally shifted. On the other hand, when the color combining optical element is shifted in tilt direction, the position of the measurement light and the position of the returned light shift vertically. Accordingly, the rotary position and tilt position of the reflection surface can be securely adjusted by eliminating the horizontal and vertical position shift between the position of the measurement light and the position of the returned light during the reflection surface rotary position adjusting step and the reflection surface tilt adjusting step.

The rotary position adjusting step and the tilt adjusting step may preferably be conducted by importing the returned light into a computer through an image pickup device and an image importing device and by processing the returned light.

According to the above arrangement, since the returned light is taken by the image pickup device and the image of the returned light is imported by the image importing device to process the image, the returned light can be accurately and automatically detected, thereby accelerating and simplifying the attachment work as well as improving the attachment accuracy of the color combining optical element.

In the above method for manufacturing a color combining optical element, a measurement light introducing step where a measurement light is introduced on one reflection surface of the color combining optical element at an incident angle of approximately forty-five degrees; a returned light detecting step where a returned light of the introduced measurement light is detected; a measurement light switching step where the measurement light is introduced on the other reflection surface along the extending direction of the one reflection surface; and a quality judging step where a returned light of the switched measurement light is detected to obtain a deviation of the other reflection surface relative to the one reflection surface and judge the quality of the color combining optical element may preferably be provided.

According to the above arrangement, the producing method is, for instance, as follows.

Initially, the measurement light is introduced to only one of the reflection surfaces during the measurement light introducing step after completing the position adjusting step, and the returned light of the introduced measurement light is detected during the returned light detecting step.

Next, during the measurement light switching step, after conducting switching process where the measurement light is introduced only on the other reflection surface along the extending direction of the one reflection surface, the measurement light is introduced on only the other reflection surface.

Subsequently, the returned light of the measurement light introduced on the other reflection surface is detected and the position of the returned light of the one reflection surface and the position of the returned light of the other reflection surface are compared to obtain deviation between the returned lights for judging whether the obtained deviation is within a range of predetermined standard value or not is determined during the quality judging step. Thus, the quality of the color combining optical system is determined.

By conducting the quality judging step, the relative position between the reflection surfaces of the respective pairs of the reflection surfaces, in other words, the angle between the reflection surfaces can be easily obtained based on the obtained deviation. At this time, whether the obtained deviation is within a standard value or not is determined and those within the standard value range are selected as conforming articles, so that the color combining optical system with high accuracy can be selectably produced.

A apparatus for manufacturing according to another aspect of the present invention is for producing a color combining optical system, the color combining optical system having: a color combining optical element that has four reflection surfaces arranged roughly in X-shape to form an incident angle of approximately forty-five degrees seen in a direction orthogonal to an optical axis of a plurality of incident light beams, the four reflection surfaces including one pair of reflection surfaces along one extending direction of roughly X-shape and the other pair of reflection surfaces along the other extending direction of roughly X-shape, the one pair of reflection surfaces reflecting a light beam having wavelength different from a light beam reflected by the other pair of reflection surfaces; and a fixing plate that is bonded on a side of the color combining optical element intersecting the reflection surfaces arranged roughly in X-shape, the machine having: a base to which the fixing plate is attached; a position adjuster that adjusts the position of the color combining optical element relative to the fixing plate mounted on the base; a measurement light introducing section that introduces a measurement light on one of the four reflection surfaces at an incident angle of approximately forty-five degrees; a returned light detector that detects a returned light of the introduced measurement light; and a measurement light switcher that introduces the measurement light on the other reflection surface along the extending direction of the one of the reflection surfaces.

According to the above aspect of the present invention, the color combining optical system is produced according to the following steps.

Initially, after the fixing plate is mounted on the base, the color combining optical element is held on the position adjuster by vacuum sucking etc. to bring the fixing plate and the color combining optical element into mutual contact. Subsequently, the position of the intersecting line of the color combining optical element is aligned with the reference position formed on the fixing plate to adjust the reference position of the color combining optical element relative to the fixing plate.

Next, the measurement light switcher is operated to introduce the measurement light on only one side of the two reflection surfaces divided by the intersecting line at an incident angle of approximately forty-five degrees to detect the returned light of the measurement light by the returned light detector. Thereafter, the position of the color combining optical element is adjusted by the position adjuster so that the deviation between the position of the measurement light and the position of the returned light is eliminated. Lastly, the positioned color combining optical element and the fixing plate are bonded by an adhesive etc. to produce the color combining optical system.

Since the position adjustment process is conducted by aligning the positions of the measurement light and the returned light, the tilt position as well as the planar position of the color combining optical element relative to the fixing plate can be adjusted, thus improving attachment accuracy of the color combining optical element relative to the fixing plate. Accordingly, the dispersion of the quality of the color combining optical system can be reduced, and the color combining optical system can be efficiently produced with low production cost.

Since the measurement light is introduced on only one of one pair of reflection surfaces and the position of the color combining optical element is adjusted by detecting the returned light thereof, even when there is minute shift between the reflection surfaces extending along one direction, only one returned light is constantly detected, thus accurately adjusting the position of the color combining optical element relative to the fixing plate.

In the apparatus for manufacturing the color combining optical system, a reference position image processor that imports an image of an intersecting line of the one pair of reflection surfaces and the other pair of reflection surfaces may preferably be provided.

According to the above arrangement, the intersecting line can be accurately and automatically aligned to the reference position of the fixing plate by importing the image of the intersecting line by the reference position image processor, thus improving the attachment accuracy of the color combining optical element relative to the fixing plate.

In the apparatus for manufacturing the color combining optical system, the measurement light introducing section and the returned light detector may preferably be integrated as an autocollimator.

According to the above arrangement, since the measurement light introducing section and the returned light detector are integrated as one autocollimator, the size of the machine can be reduced as compared to an arrangement for separately providing the measurement light introducing section and the returned light detector.

In the apparatus for manufacturing the color combining optical system, an image processor that imports and processes an image of the returned light taken by an image pickup device connected to the returned light detector through an image importing device may preferably be provided.

According to the above arrangement, since the image of the returned light taken by the image pickup device etc. is imported by the image importing device to be processed, the returned light can be accurately and automatically detected, thus accelerating and facilitating the attachment process as well as improving the attachment accuracy of the color combining optical element.

In the above apparatus for manufacturing the color combining optical system having the image processor, an angle sensor that measures an angle between the reflection surfaces of one of the two pairs of the reflection surfaces based on the result of image processing of the returned light reflected by the reflection surfaces of the one of the two pairs of reflection surfaces in the image processor; and a quality judging section that determines whether the measured angle is within a range of standard value or not may preferably be provided.

According to the above arrangement, since the angle between the two reflection surfaces is measured by the angle sensor and whether the measured angle is within the standard value range or not is determined by the quality judging section to select those within the standard value range as conforming articles, only the color combining optical element constructed with high accuracy can be selectably produced.

Incidentally, an alarm generator for generating an alarm when the measured angle is determined the nonstandard value range may be provided on the image processor. According to the above arrangement, the worker can immediately recognize the presence of the defective by the alarm generated by the alarm generator, so that the defective can be prevented from mixing into the conforming article.

In the apparatus for manufacturing the color combining optical system, a reflection component that reflects the light beam reflected by the reflection surface to introduce to the returned light detector as the returned light may preferably be provided.

According to the above arrangement, since the light beam securely reflected by the reflection component can be set as the returned light, the brightness of the returned light can be enhanced as compared to an arrangement where, for instance, the light beam reflected by a side of a prism etc. is set as the returned light, so that the returned light can be more easily detected by the returned light detector.

A color combining optical system according to still another aspect of the present invention is characterized by produced by the above described method for manufacturing the color combining optical system. A method for manufacturing a projector according to further aspect of the present invention is characterized by including the above method for manufacturing the color combining optical system.

According to the above, approximately the same function and advantages as the method for manufacturing the color combining optical system and the apparatus for manufacturing the color combining optical system can be obtained, thus combining the color lights with high accuracy by the color combining optical system, thus providing vivid projection image to the viewer.

DETAILED DESCRIPTION OF THE PREFERRED EMBODIMENT (S)

An embodiment of the present invention will be described below with reference to attached drawings.

[1. Structure of Projector]

Figure 1:
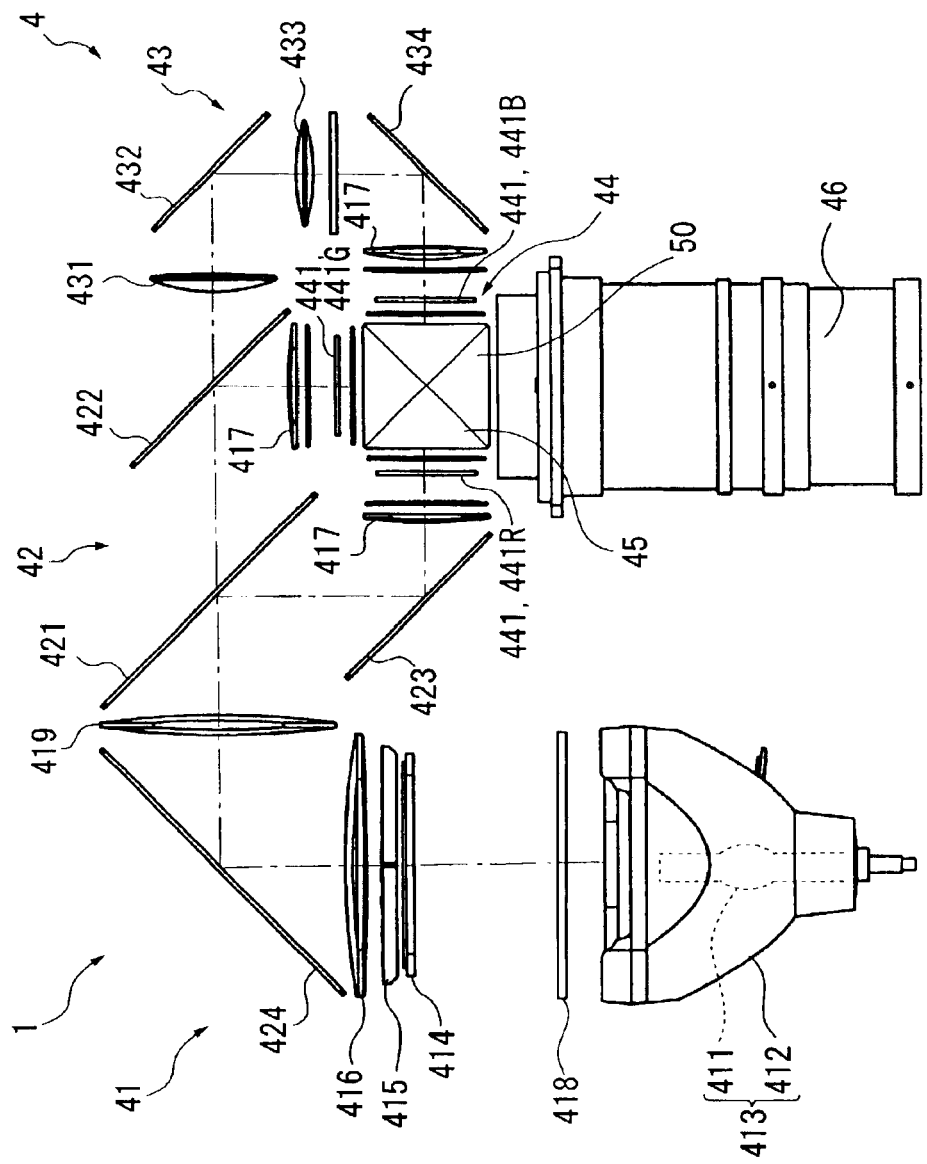
FIG. 1 is a schematic illustration of a projector having a prism unit according to an embodiment of the present invention.
Figure 2:
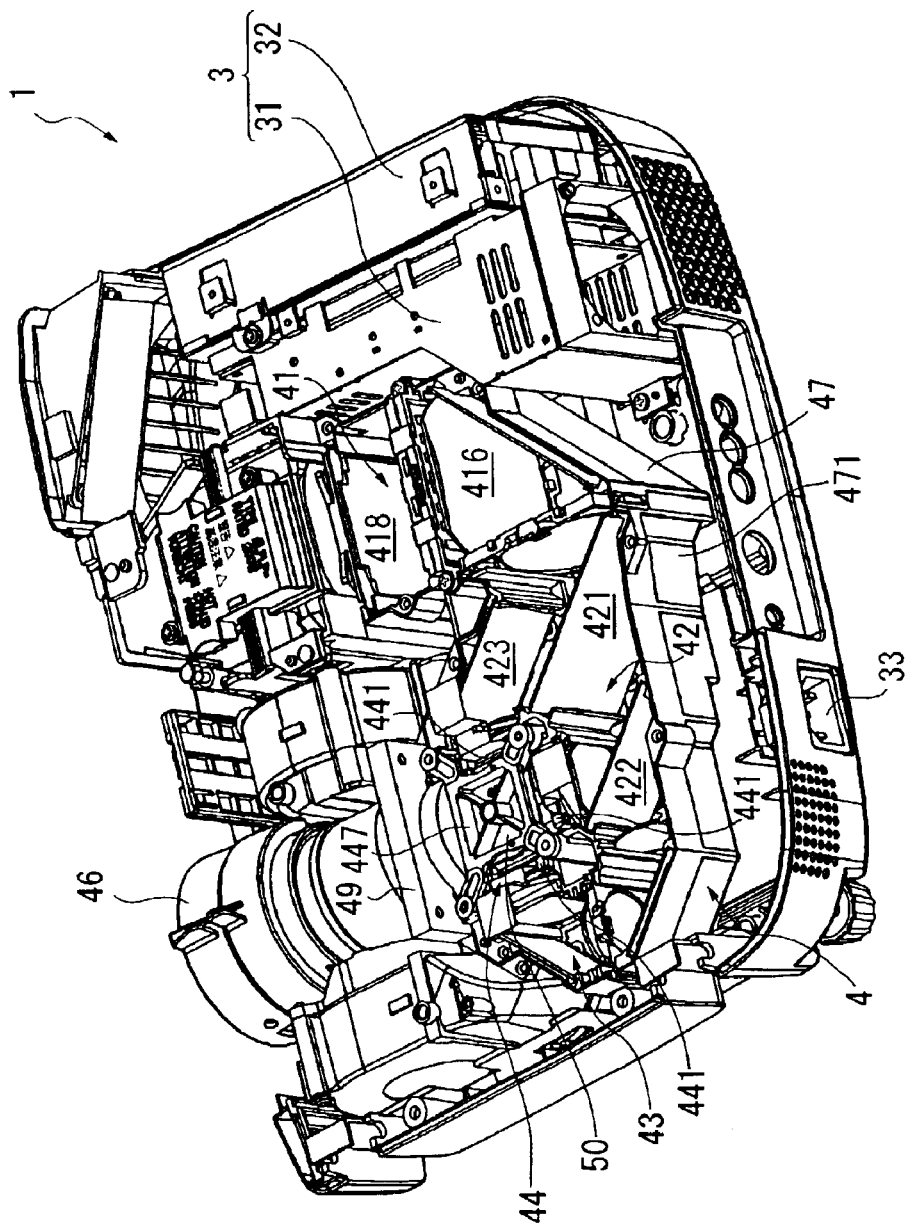
FIG. 2 is a perspective view showing the interior of the projector.

FIG. 1 is a schematic illustration of a projector 1 having a prism unit as a color combining optical system. FIG. 2 is a perspective view showing the interior of the projector 1.

As shown in FIGS. 1 and 2, the projector 1 has a power source unit 3 housed in an exterior casing and an optical unit 4 of planar U-shape also disposed in the exterior case, the entirety of the projector 1 being approximately rectangular parallelepiped.

The power source unit 3 has a power source 31 and a lamp driving circuit (ballast) 32 located on a side of the power source 31.

The power source 31 supplies electric power supplied through a power source cable to the lamp driving circuit 32 and a non-illustrated driver board, which includes an inlet connector 33 for the power source cable to be plugged. The lamp driving circuit 32 supplies electric power to a light source lamp 411 of the optical unit 4.

[2. Structure of Optical Unit]

The optical unit 4 is a unit for modulating a light beam irradiated from a light source lamp 411 in accordance with image information to form an optical image, which has an integrator illumination optical system 41, a color separating optical system 42, a relay optical system 43, an electric optical device 44, a prism unit 50 as a color combining optical system, a projection lens 46, and a light guide 47 made of synthetic resin that houses the optical systems 41 to 44 and 50.

The integrator illuminating optical system 41 is an optical system for substantially uniformly illuminating the image formation area of the three liquid crystal panels 441 of the electric optical device 44 (respectively referred to as liquid crystal panel 441R, 441G and 441B for every color lights of red, green and blue), which includes a light source 413, a first lens array 418, a second lens array 414, a polarization converter 415, a first condenser lens 416, a reflection mirror 424 and a second condenser lens 419.

The light source 413 has a light source lamp 411 as a radiation light source for irradiating radiation light beam, and a reflector 412 for reflecting the radiation light beam irradiated from the light source lamp 411. The light source lamp 411 is a high-pressure mercury lamp, however halogen lamp or metal halide lamp may be used instead of the high-pressure mercury lamp. A parabolic mirror is used as the reflector 412. The reflector 412 may be a combination of a parallelizing lens (concave lens) and an ellipsoidal mirror instead of a parabolic mirror.

The first lens array 418 has a structure in which a plurality of small lenses is arranged in matrix, the lenses having substantially rectangular profile viewed from optical axis direction. The respective small lenses split the beam irradiated from the light source lamp 411 into a plurality of sub-beams. The profile of the respective small lenses is approximately similar to the configuration of the image formation area of the liquid crystal panel 441. For instance, when the aspect ratio (ratio of horizontal and vertical dimensions) of the image formation area of the liquid crystal panels 441 is 4:3, the aspect ratio of the respective lenses is also set as 4:3.

The second lens array 414 has approximately the same arrangement as the first lens array 418, where the small lenses are disposed in matrix. The second lens array 414 as well as the first condenser lens 416 and the second condenser lens 419 focuses the image from the respective small lenses of the first lens array 418 onto the liquid crystal panel 441.

The polarization converter 415 is disposed between the second lens array 414 and the first condenser lens 416 and is integrated with the second lens array 414 as a unit. The polarization converter 415 converts the light from the second lens array 414 to a single polarized light in order to enhance light utilization efficiency in the electric optical device 44.

Specifically, the respective sub-beams converted into single polarized light by the polarization converter 415 are finally substantially superposed on the liquid crystal panels 441R, 441G and 441B of the electric optical device 44 by the first condenser lens 416 and the second condenser lens 419. Since the projector 1 using the liquid crystal panel 441 for modulating polarized light can use only single polarized light, approximately half of the light from the light source lamp 411 irradiating other random polarized light cannot be used. Accordingly, by using the polarization converter 415, all of the light irradiated from the light source lamp 411 is converted into single polarized light to enhance light utilization efficiency in the electric optical device 44.

The color separating optical system 42 has two dichroic mirrors 421 and 422 and a reflection mirror 423, the dichroic mirrors 421 and 422 separating the plurality of sub-beams irradiated from the integrator illuminating optical system 41 into three color lights of red (R), green (G) and blue (B).

The relay optical system 43 has an incident-side lens 431, a relay lens 433 and reflection mirrors 432 and 434, and introduces the blue light separated by the color separating optical system 42 onto the liquid crystal panel 441B.

At this time, the blue light component and the green light component of the light beam irradiated from the integrator illuminating optical integrator system 41 are transmitted through the dichroic mirror 421 of the color separating optical system 42 and the red light component is reflected by the dichroic mirror 421. The red light reflected by the dichroic mirror 421 is reflected by the reflection mirror 423, which reaches the liquid crystal panel 441R for red-color through a field lens 417. The field lens 417 converts the respective sub-beams irradiated from the second lens array 414 into a light beam parallel to central axis (main beam) thereof. The field lenses 417 provided at light incident sides of the other liquid crystal panels 441G and 441B function in the same manner.

In the blue light and the green light transmitted through the dichroic mirror 421, the green light is reflected by the dichroic mirror 422 to reach the liquid crystal panel 441G for green color through the field lens 417. On the other hand, the blue color transmits through the dichroic mirror 422 to pass the relay optical system 43 and reach the liquid crystal panel 441B for blue color through the field lens 417. Incidentally, the relay optical system 43 is used for the blue light in order to prevent decrease in utilization efficiency of light on account of light diffusion caused by longer length of the optical path of the blue light than the length of the optical path of the other color lights, in other words, in order to directly transmit the sub-beam incident on the incident-side lens 431 to the field lens 417.

The electric optical device 44 has the liquid crystal panels 441R, 441G and 441B as three optical modulators, which use, for instance, a polysilicon TFT as a switching element. The respective color lights separated by the color separating optical system 42 are modulated by the three liquid crystal panels 441R, 441G and 441B in accordance with image information to form an optical image.

[3. Structure of Color Combining Optical System]

The prism unit 50 is attached to a predetermined position of the light guide 47 for combining respective color lights modulated and irradiated by the three liquid crystal panels 441R, 441G and 441B to form a color image, which includes a cross dichroic prism 45 as a color combining optical element and a fixing plate 447 bonded to a side of the cross dichroic prism 45.

Figure 3:
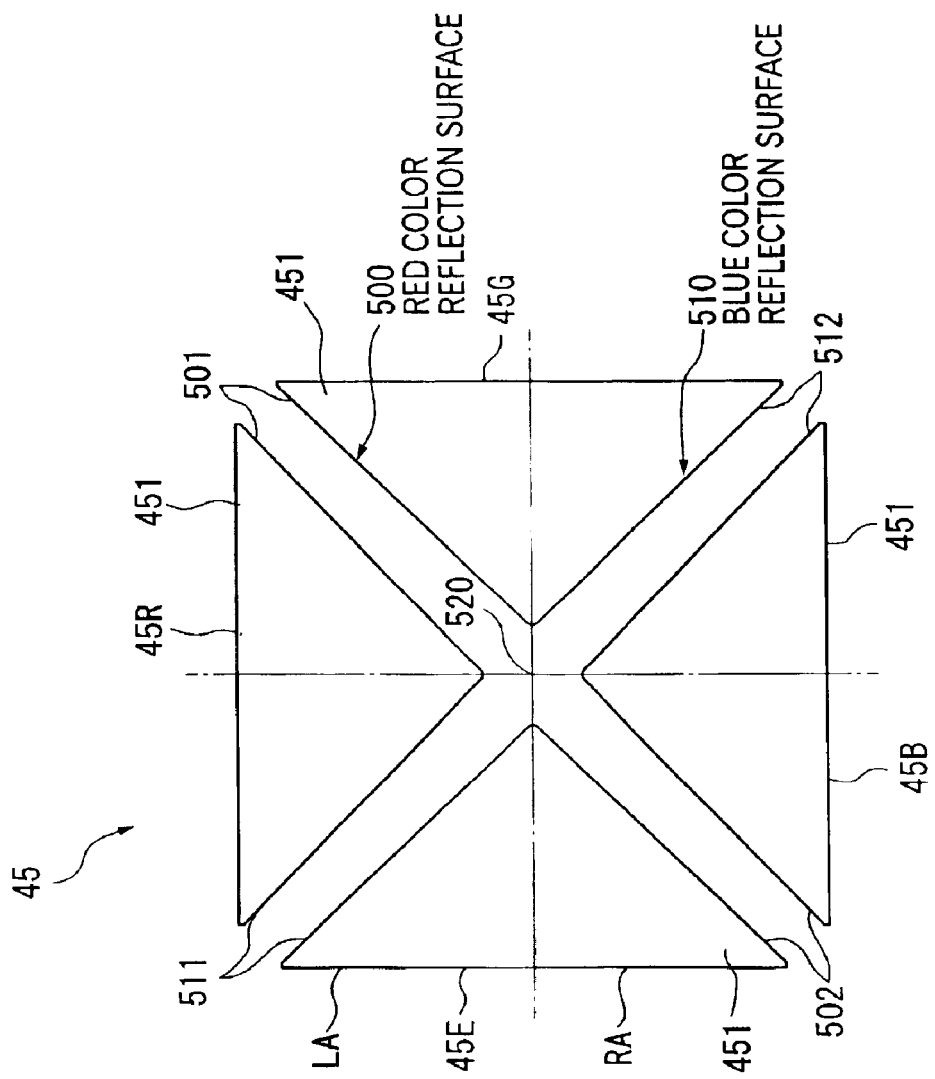
FIG. 3 is an exploded plan view of a cross dichroic prism of the prism unit.

FIG. 3 is an exploded plan view of the cross dichroic prism 45.

As shown in FIG. 3, the cross dichroic prism 45 is constructed to combine the respective color lights irradiated from three liquid crystal panels 441R, 441G and 441B (FIG. 1) to form a color image, which is rough cube formed by adhering four right angle prisms 451 along boundaries thereof.

Non-illustrated dielectric multi-layer film for reflecting red light of a predetermined wavelength band is provided on a red-color reflection surface 500 composed of two surfaces 501 and 502 along one extension direction of the boundaries.

Another dielectric multi-layer film for reflecting blue light of a wavelength band different from the above wavelength band is provided on a blue-color reflection surface 510 composed of two reflection surfaces 511 and 512 along the other extension direction of the boundaries.

Accordingly, four reflection surfaces 501, 502, 511 and 512 that intersect with each other by ninety degrees are located in the cross dichroic prism 45 roughly in X-shape. An intersecting line 520 of the two color reflection surfaces 500 and 510 is a line indicating center position of the cross dichroic prism 45. The color image combined by the cross dichroic prism 45 is irradiated from the projection lens 46 and is enlarged and projected on a screen.

Incidentally, another cross dichroic prism where the red-color reflection surface 500 and the blue-color reflection surface 510 are inversely arranged relative to the cross dichroic prism 45 of the present embodiment may be used. However, in the following description, the above-described cross dichroic prism 45 is taken as an example.

Figure 4:
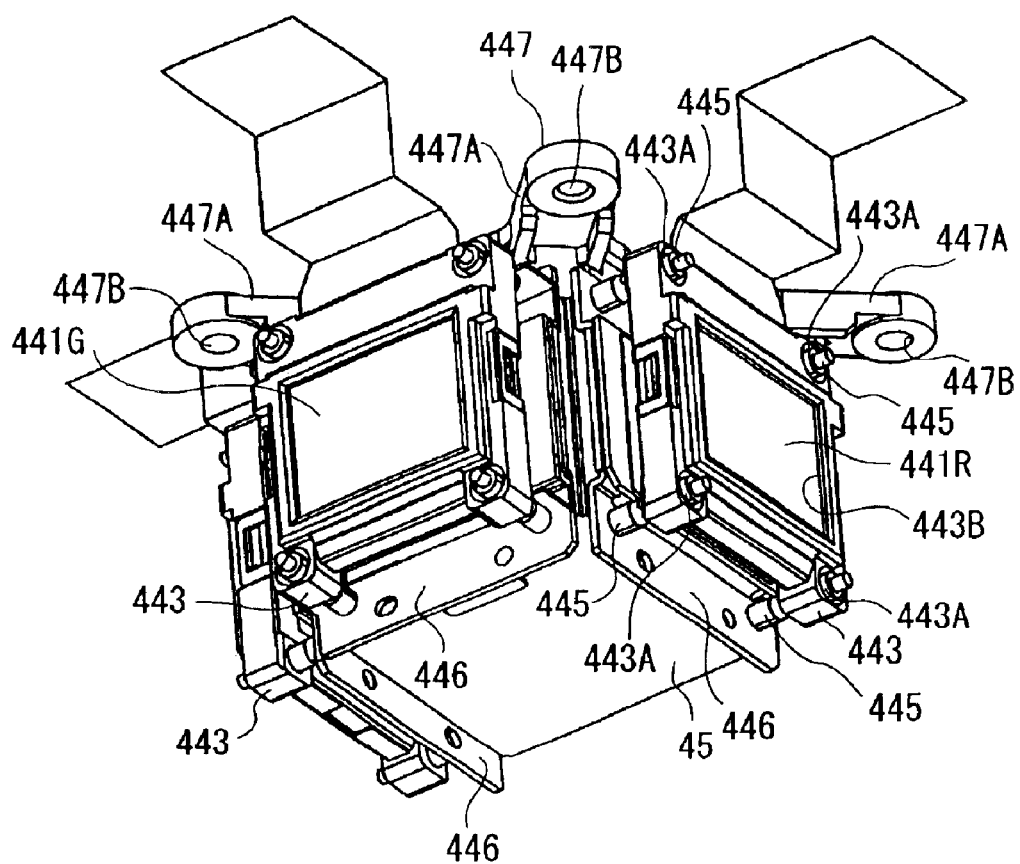
FIG. 4 is a perspective view showing an arrangement of an optical component including the prism unit.
Figure 5:
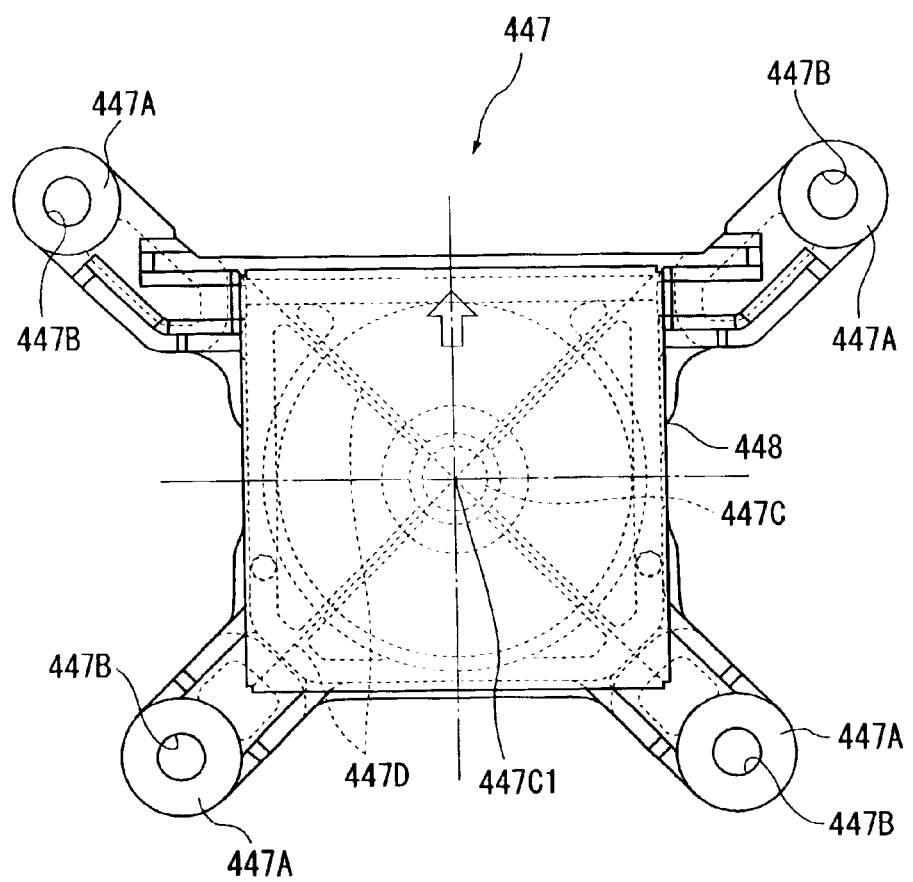
FIG. 5 is a plan view showing a fixing plate of the prism unit.

FIG. 4 is a perspective view showing an arrangement of the optical components including the prism unit 50. FIG. 5 is a plan view showing the fixing plate 447.

As shown in FIGS. 4 and 5, the fixing plate 447 has a fixed plate body 448 that is roughly square in plan view and four arms 447A projecting outward from the four corners of the fixed plate body 448.

The fixed plate body 448 has spherical bulging portion 447C at the center thereof.

Roughly X-shaped reference line 447D intersecting at a reference point 447C1 at the top of the bulging portion 447C, i.e. at the center of the fixed plate body 448, is formed on the diagonal line of the square of the fixed plate body 448.

One circular hole 447B is formed on the respective arms 447A. Diagonally arranged two circular holes 447B are to be fitted to positioning projections formed on the light guide 47 and the remaining two circular holes 447B are holes for inserting the screw to be screwed to the light guide 47.

The structure of the integrated optical components including the electric optical device 44 and the prism unit 50 will be described below with reference to FIGS. 4 and 5.

As shown in FIG. 4, the respective liquid crystal panels 441R, 441G and 441B are held by the holding frame 443 and is bonded on the light-incident side of the cross dichroic prism 45 through a metal fixing plate 446 by inserting transparent resin pin 445 with an ultraviolet curing adhesive into the hole 443A formed on the four corners of the holding frame 443.

Rectangular opening 443B is formed on the holding frame 443. The respective liquid crystal panels 441R, 441G and 441B are exposed on the opening 443B to form an image formation area. In other words, the respective color lights R, G and B are introduced to the image formation area of the respective liquid crystal panels 441R, 441G and 441B to form an optical image in accordance with image information. The optical components including the integrated liquid crystal panels 441R, 441G and 441B and the prism unit 50 are fixed on a lower light guide 471 through the fixing plate 447 adhered to an upper surface 45A (a surface orthogonal to the light-incident surface) of the cross dichroic prism 45.

As shown in FIG. 2, the light guide 47 has the lower light guide 471 provided with a groove for slidably fitting the respective optical components 414 to 419, 421 to 424 and 431 to 434 from above, and a lid-shaped upper light guide (not shown) for closing upper opening of the lower light guide 471.

A head component 49 is formed on the light irradiation side of the light guide 47. The projection lens 46 is fixed on the front side of the head component 49 and a prism unit 50 attached with the liquid crystal panels 441R, 441G and 441B is located on the rear side thereof.

[4. Structure of Apparatus for Manufacturing Color Combining Optical System]

Figure 6:
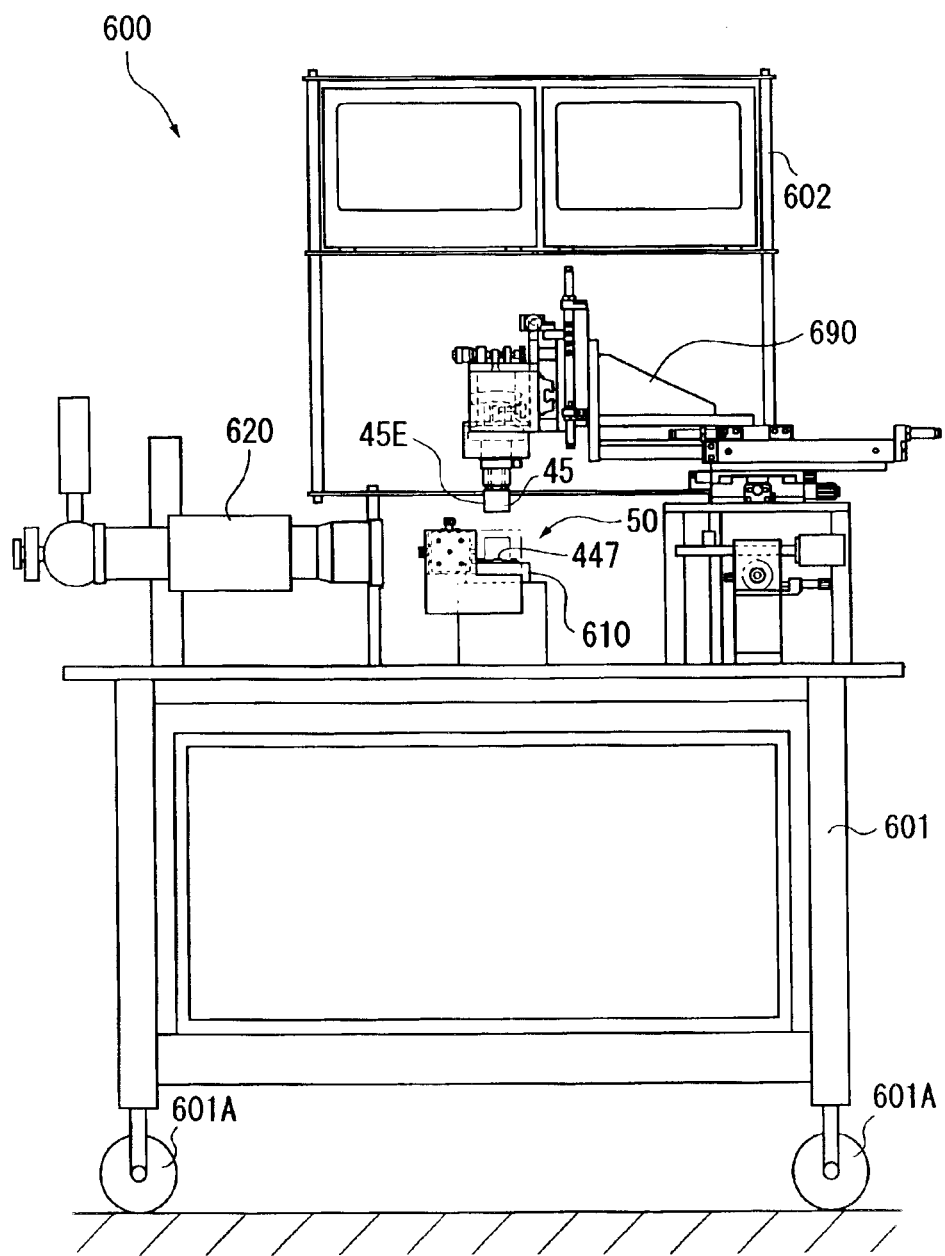
FIG. 6 is a front elevational view showing a prism unit manufacturing apparatus as an apparatus for manufacturing color combining optical system according to the present invention.
Figure 7:
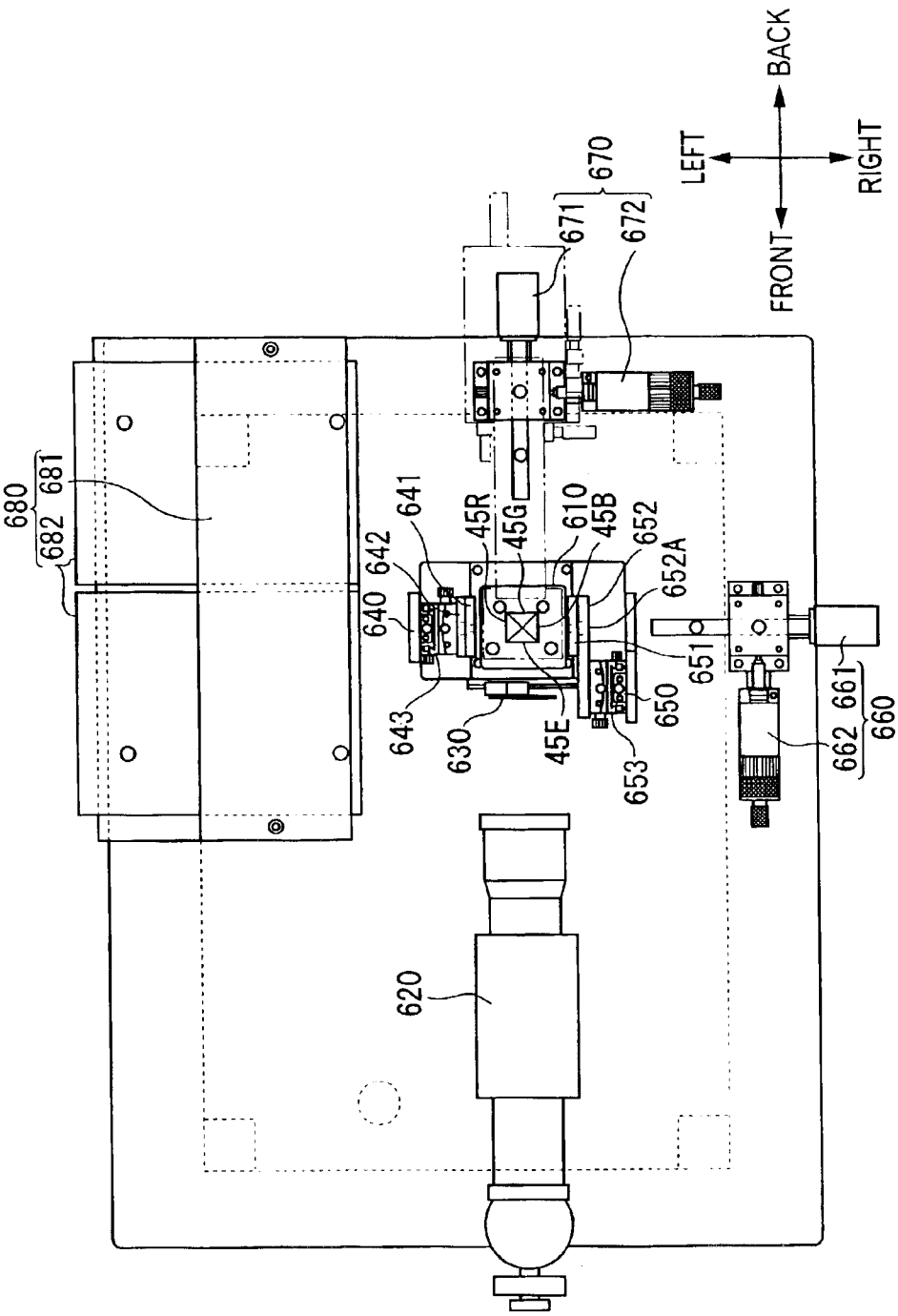
FIG. 7 is a plan view showing the prism unit manufacturing apparatus.
Figure 8:
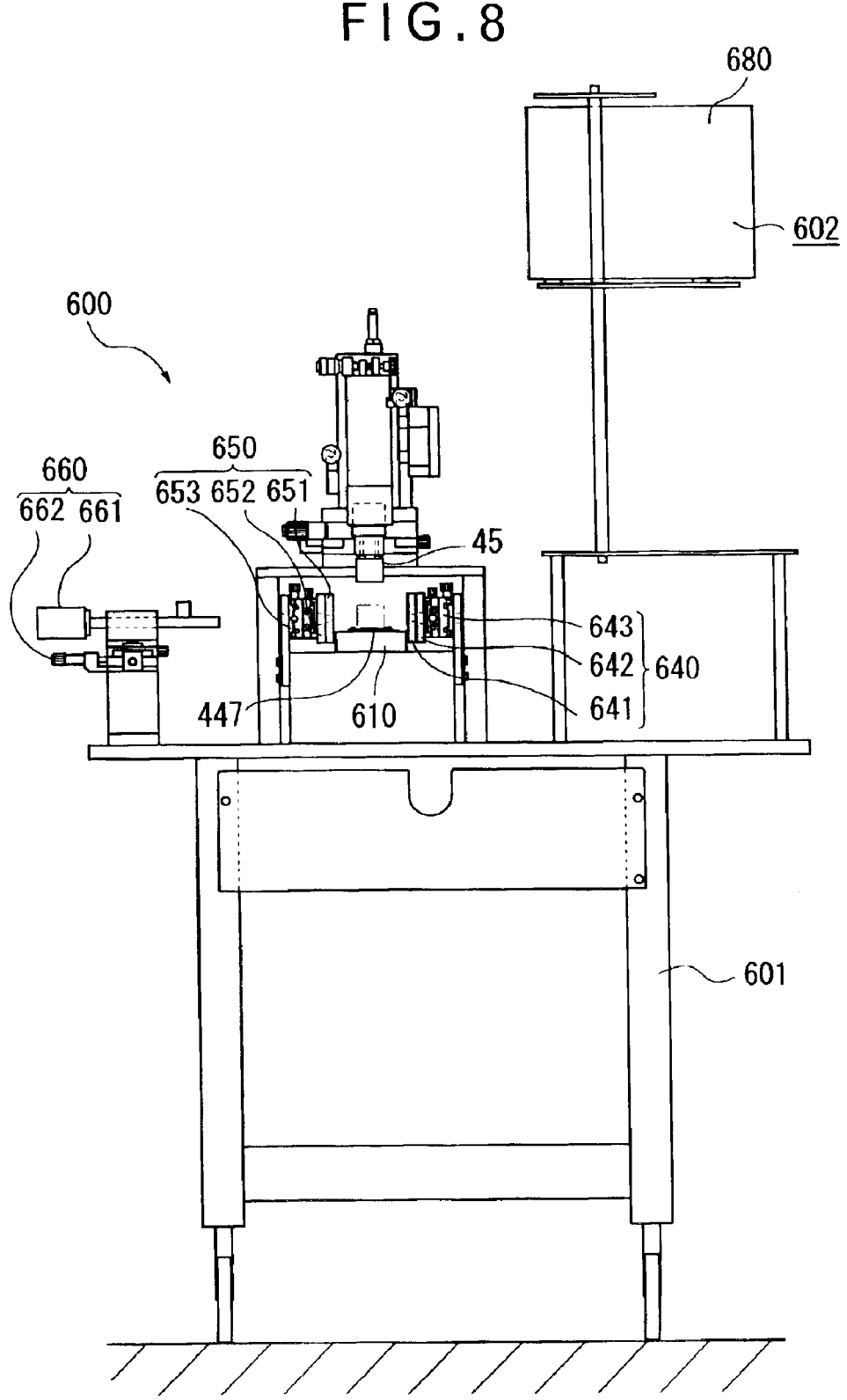
FIG. 8 is a side elevational view showing the prism unit manufacturing apparatus.

FIG. 6 is a front elevational view showing a prism unit manufacturing apparatus 600 as an apparatus for manufacturing the color combining optical system, FIG. 7 is a plan view thereof and FIG. 8 is a side elevational view thereof.

The prism unit manufacturing apparatus 600 is a mechanism in which the prism unit 50 is produced by bonding the cross dichroic prism 45 after adjusting the position thereof relative to the fixing plate 447. The prism unit manufacturing apparatus 600 has a platform 601 movable with a castor 601A provided on the lower side thereof, and a machine body 602 mounted on the platform 601.

As shown in FIG. 6, the manufacturing apparatus body 602 has a base 610 to which the fixing plate 447 is attached, a position adjuster 690 for adjusting the position of the cross dichroic prism 45 relative to the fixing plate 447, and an autocollimator 620 located opposite to the position adjuster 690 with intervening the base 610. An irradiation side 45E of the cross dichroic prism 45 mounted on the fixing plate 447 is placed opposite to the autocollimator 620.

As shown in FIGS. 6 to 8, the manufacturing apparatus body 602 has a switcher 630 as a measurement light switching portion located between the autocollimator 620 and the fixing plate 447, two reflecting devices 640 and 650 as a reflecting component respectively opposing to incident sides 45B and 45R of the cross dichroic prism 45, depth-measuring CCD camera 660 located on the rear side of the reflecting device 650, a laterally-measuring CCD camera 670 opposing to an incident side 450 of the cross dichroic prism 45, a computer 680 for image-processing the detected result of the two CCD cameras 660 and 670 to display the processed image on a monitor 682 and a non-illustrated drive body for controlling the drive of the reflecting devices 640 and 650.

Though not shown, a fixing ultraviolet light source for curing the ultraviolet curing adhesive to fix the cross dichroic prism 45 to the fixing plate 447 is located near the platform 601.

Incidentally, in the prism unit manufacturing apparatus 600, left side seen from autocollimator 620 is represented as left direction, right side is represented as right direction, front side is represented as front direction, and rear side is represented as rear direction.

The base 610 is for mounting various optical components including the fixing plate 447. A hole corresponding to the circular hole 447B of the arm 447A of the fixing plate 447 is formed on the upper surface thereof and the base 610 and the fixing plate 447 are screwed through the hole and the circular hole 447B.

Figure 9:
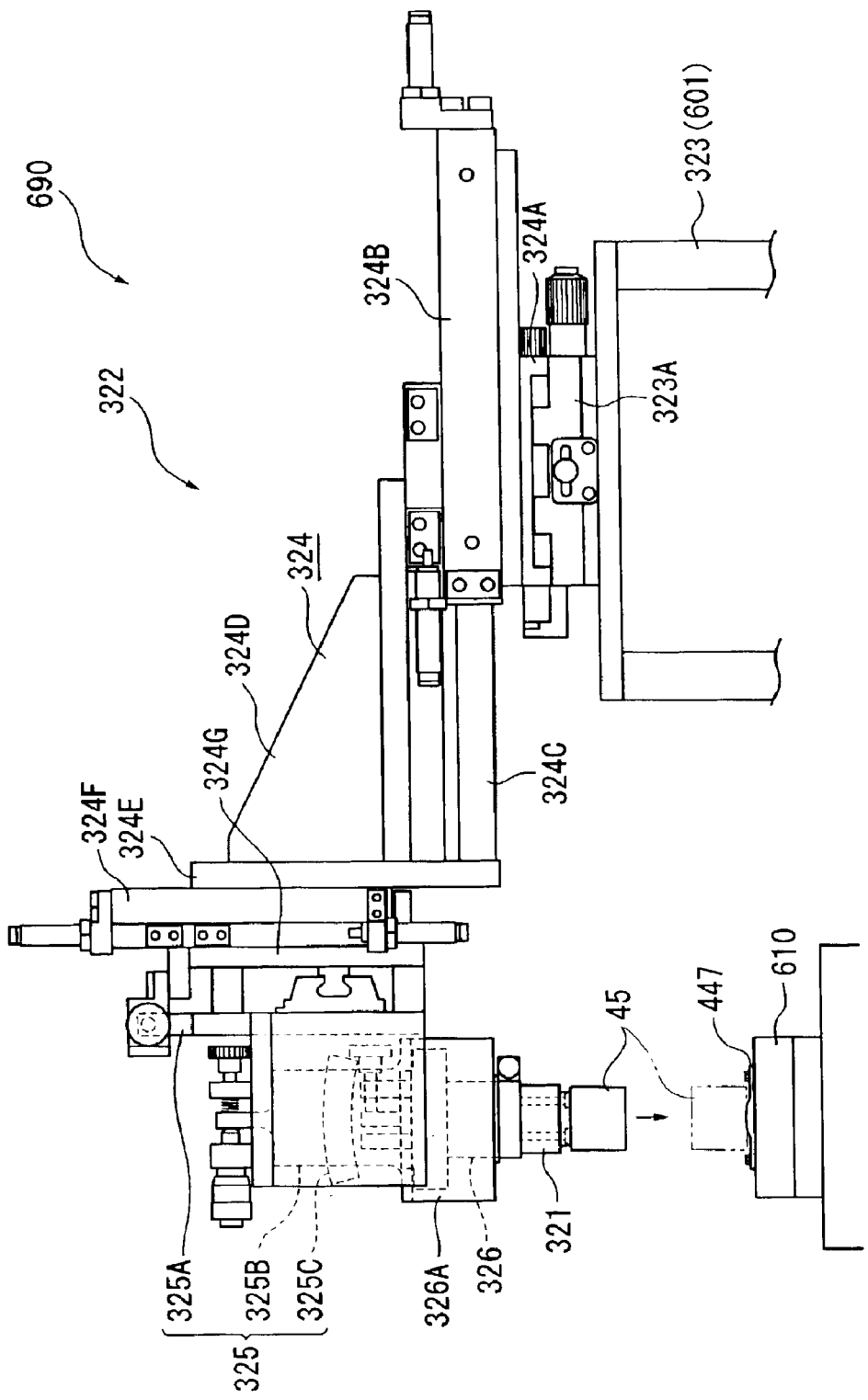
FIG. 9 is an enlarged illustration of a position adjuster of the prism unit manufacturing apparatus.

FIG. 9 is an enlarged illustration of the position adjuster 690.

The position adjuster 690 is for adjusting three-dimensional position of the cross dichroic prism 45, which includes an adjuster body 322 supported and fixed on the platform 601 and a prism holder 321 provided on the end of the adjuster body 322.

The prism holder 321 sucks and holds a side of the cross dichroic prism 45 through a buffer material.

Non-illustrated ultraviolet irradiating device is provided adjacent to abutting surface on the end of the prism holder 321, and ultraviolet is irradiated from the ultraviolet irradiating device to cure non-illustrated ultraviolet curing adhesive interposed between the cross dichroic prism 45 and the fixing plate 447 through the cross dichroic prism 45.

As shown in FIG. 9, the adjuster body 322 adjusts the attitude of the prism holder 321 being driven by a motor etc., so that three-dimensional position of the cross dichroic prism 45 sucked by the prism holder 321 can be freely adjusted.

The adjuster body 322 has a base 323 fixed on the platform 601, a planar position adjuster 324 movable relative to the upper surface of the base 323, an out-plane rotary position adjuster 325 provided on the end of the planar position adjuster 324, and an in-plane rotary position adjuster 326 provided on the end of the out-plane rotary position adjuster 325. The prism holder 321 is provided on the end part of the in-plane rotary position adjuster 326.

The planar position adjuster 324 adjusts the position in the depth and lateral direction of the cross dichroic prism 45 relative to the fixing plate 447, which includes a lateral adjuster 324A slidable along a rail 323A on the base 323, an engaging member 324B of rough rectangular frame shaped cross section fixed on the lateral adjuster 324A, a depth adjuster 324C slidable within the rectangular frame of the engaging member 324B, a leg 324D vertically mounted on the depth adjuster 324C, a vertical adjuster 324F mounted on the upper end of the leg 324D, a connector 324E for connecting the vertical adjuster 324F and the leg 324D, and a connector 324G provided on the vertical adjuster 324F to which the out-plane rotary position adjuster 325 is connected.

The respective adjusters 324A and 324C are moved by a non-illustrated drive mechanism such as a motor in a direction orthogonal to the paper surface of FIG. 9 and in a right and left direction along the paper surface on the platform 601. The vertical adjuster 324F is vertically moved in FIG. 9 by a non-illustrated drive mechanism such as a motor relative to the connector 324E.

The out-plane rotary position adjuster 325 adjusts the out-plane rotary position of the cross dichroic prism 45 relative to the fixing plate 447.

The out-plane rotary position adjuster 325 has a first adjuster 325A fixed on the end of the planar position adjuster 324 and slidable to form an arc in vertical direction, a roughly sectoral adjuster guide 325C attached to the first adjuster 325A, and a second adjuster 325B slidable along the adjuster guide 325C to form an arc in right and left direction.

When a non-illustrated motor provided on the upper side of the first adjuster 325A is rotated, the first adjuster 325A is slid. When a non-illustrated motor provided on the upper side of the second adjuster 325B is rotated, the second adjuster 325B is slid. Accordingly, the out-plane rotary position of the cross dichroic prism 45 relative to the fixing plate 447 can be adjusted with high accuracy.

The in-plane rotary position adjuster 326 adjusts the in-plane rotary position of the cross dichroic prism 45 relative to the fixing plate 447, which is attached to a lower end of the out-plane rotary position adjuster 325 to be engaged with a cylindrical base 326A having a hole of approximately the same profile as the in-plane rotary position adjuster 326 vertically penetrating therethrough, and is rotatably provided in circumferential direction of the base 326A. The in-plane rotary position of the cross dichroic prism 45 relative to the fixing plate 447 can be adjusted with high accuracy by adjusting rotary position of the in-plane rotary position adjuster 326.

Figure 10:
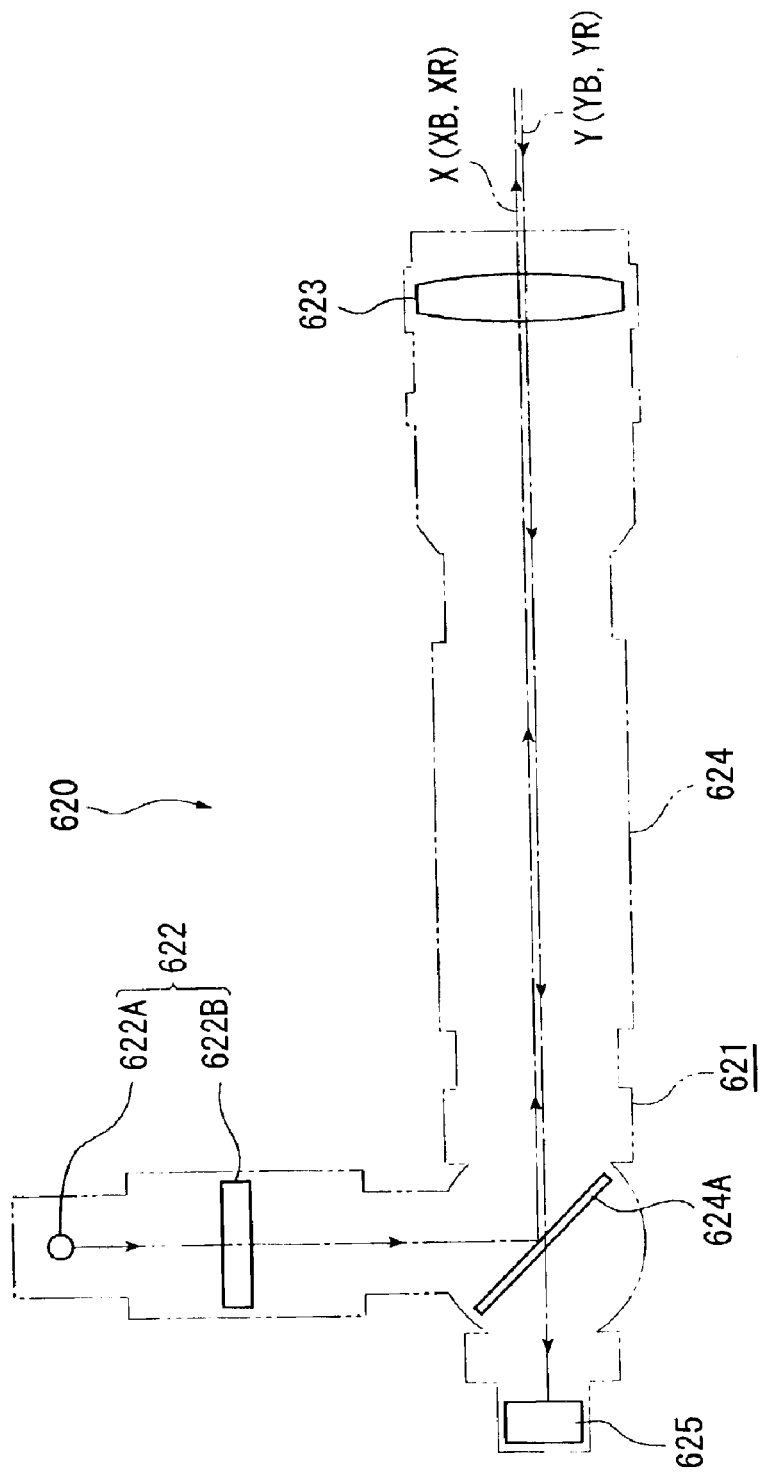
FIG. 10 is a schematic cross section of an autocollimator of the prism unit manufacturing apparatus.

FIG. 10 is a schematic cross section showing the autocollimator 620.

As shown in FIGS. 7 and 10, the autocollimator 620 approximately vertically introduces measurement light X onto the irradiation side 45E of the cross dichroic prism 45, detects a returned light Y, and freely adjusts the position thereof relative to the prism unit 50, which includes an autocollimator body 621 and a 3-CCD camera 625. Accordingly, the measurement light introducing section and returned light detector of the present invention are integrated in the autocollimator 620.

Incidentally, when the measurement light X is introduced approximately vertically on the irradiation side 45E of the cross dichroic prism 45, the measurement light X is introduced on the four reflection surfaces 501, 502, 511 and 512 of the cross dichroic prism 45 at an incident angle of approximately forty-five degrees.

The autocollimator body 621 has a light source unit 622 for irradiating the measurement light X, an objective lens 623 for irradiating the measurement light X irradiated from the light source unit 622 as a parallel light beam, and a light introducing section 624 for introducing the measurement light X irradiated from the light source unit 622 and the returned light Y of the measurement light X.

The light source unit 622 is located on a back focus position of the objective lens 623, which includes a light source 622A for irradiating the measurement light X as a halogen light, and a chart 622B having a "+" shaped transmission hole. The measurement light X irradiated from the light source 622A passes through the chart 622B to be irradiated on the light introducing section 624 as a measurement light X having "+" shape.

The light introducing section 624 has a half mirror 624A disposed at approximately forty-five degrees relative to the chart 622B of the light source unit 622. The measurement light X irradiated from the light source unit 622 is reflected by the half mirror 624A and subsequently is paralleled by the objective lens 623 to be irradiated t outside.

Figure 11:
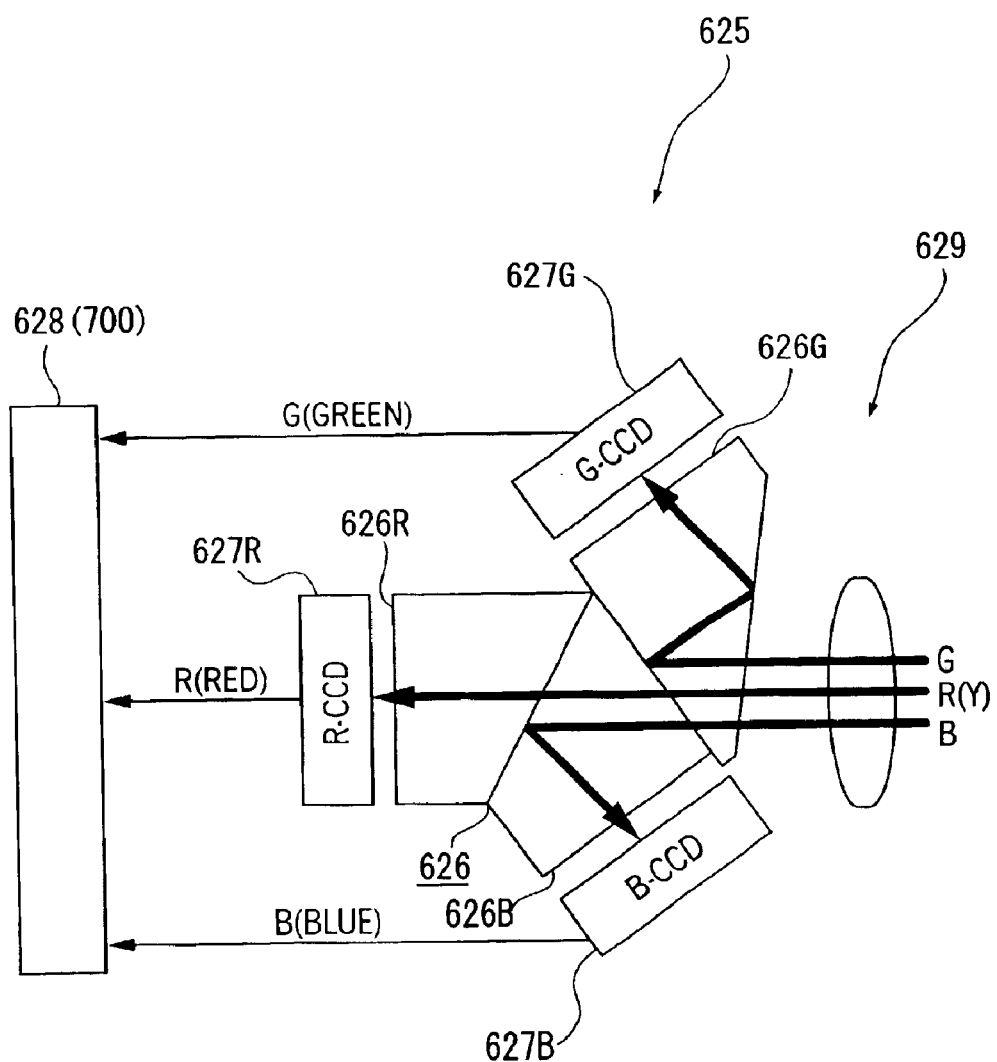
FIG. 11 is an illustration of a primary portion of a 3-CCD camera of the autocollimator.

FIG. 11 is a schematic illustration of the 3-CCD camera 625 and a processor. As shown in FIG. 11, the 3-CCD camera 625 detects a returned light Y having "+" shape, which includes a color-separating dichroic prism 626, a 3-CCD camera body 629 having red-color image pickup device (R-CCD) 627R, a green-color image pickup device (G-CCD) 627G and a blue-color image pickup device (B-CCD) 627B respectively located on the light-irradiation sides 626R, 626G and 626B of the color separating dichroic prism 626, and a processor 628 included in a computer 700 independent of the computer 680.

The color-separating dichroic prism 626 is constructed by adhering three prisms of a predetermined shape, which separates the returned light Y having "+" shape into three color lights of red light R, green light G and blue light B. Incidentally, since the returned light Y is returned after being separated into red light R or the blue light B, the color-separating dichroic prism 626 works for changing the direction of the light beam for each color light rather than separating the light into three color lights.

The respective image pickup devices 627R, 627G and 627B are electrically connected with the processor 628 and the image signal detected by the image pickup devices 627R, 627G and 627B is outputted to the processor 628.

Figure 12:
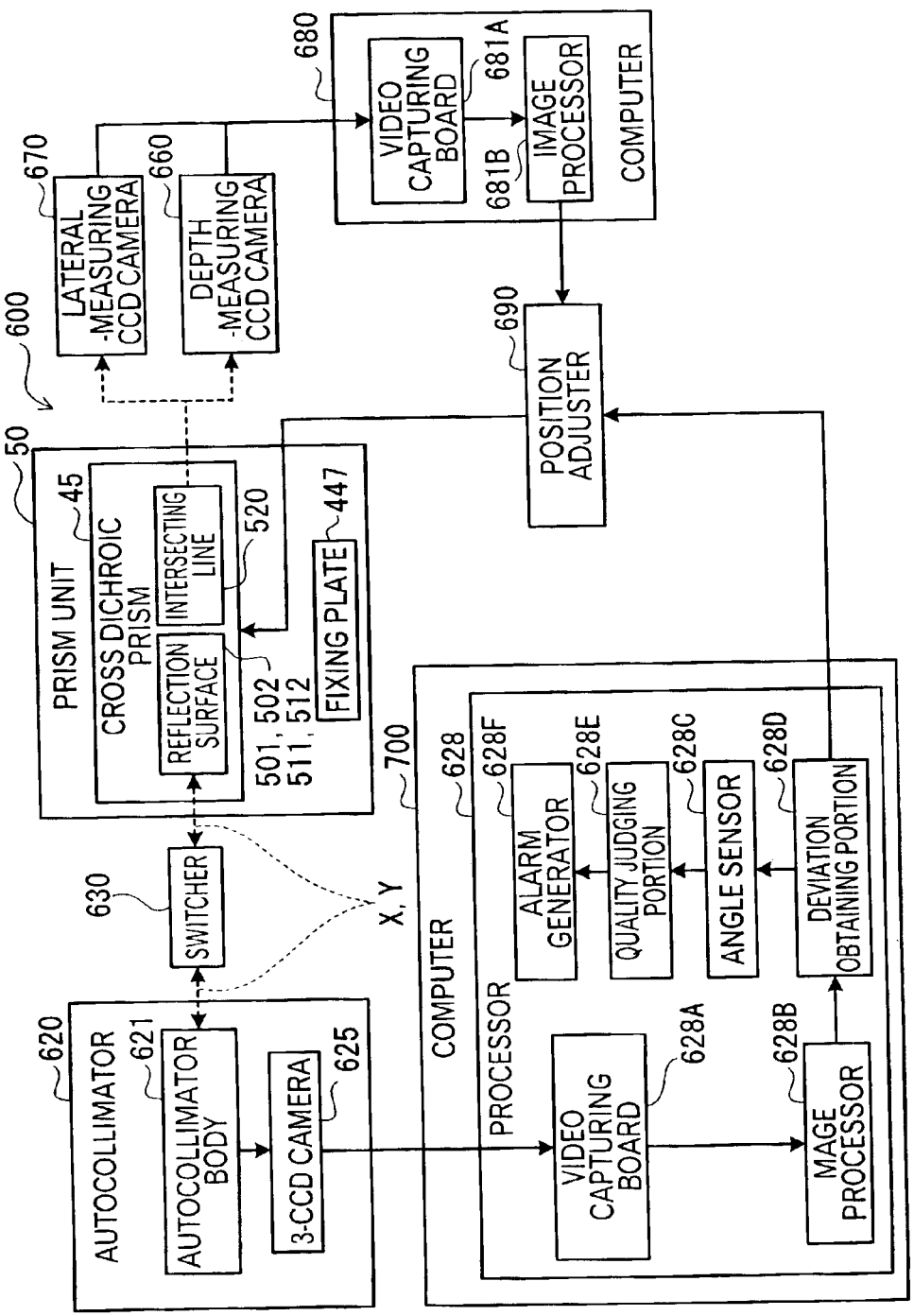
FIG. 12 is a block diagram showing the prism unit manufacturing apparatus.

FIG. 12 is a block diagram showing an arrangement of the prism unit manufacturing apparatus 600 including the processor 628.

As shown in FIG. 12, the processor 628 has a video capturing board 628A as an image importing device for importing the returned light Y detected by the respective image pickup devices 627R, 627G and 627B of the 3-CCD camera 625 (FIG. 11) as an image signal, an image processor 628B for processing the image signal imported by the video capturing board 628A, and a deviation obtaining section 628D for obtaining deviation between the designed position of the measurement light X and the position of the returned light Y based on the result of the image processing.

The deviation obtaining section 628D calculates vertical and lateral position adjustment amount of the cross dichroic prism 45 based on the obtained deviation to output the calculated result to the position adjuster 690. The position adjuster 690 adjusts the position of the cross dichroic prism 45 based on the calculated result.

The processor 628 has an angle sensor 628C for measuring the angle between the two reflection surfaces 501 and 502 on the red-color reflection surface 500 and the angle between the two reflection surfaces 511 and 512 on the blue-color reflection surface 510 of the cross dichroic prism 45 based on the deviation obtained by the deviation obtaining section 628D, a quality judging section 628E for determining whether the measured angle is within the range of standard value or not and an alarm generator 628F for generating alarm when the quality judging section 628E judges that a product is defective since the measured angle is the nonstandard value.

Though not illustrated, an eyepiece for enlarging the returned light Y may be provided instead of the 3-CCD camera 625 be used and the returned light Y may be detected with naked eye through the eyepiece.

Figure 13:
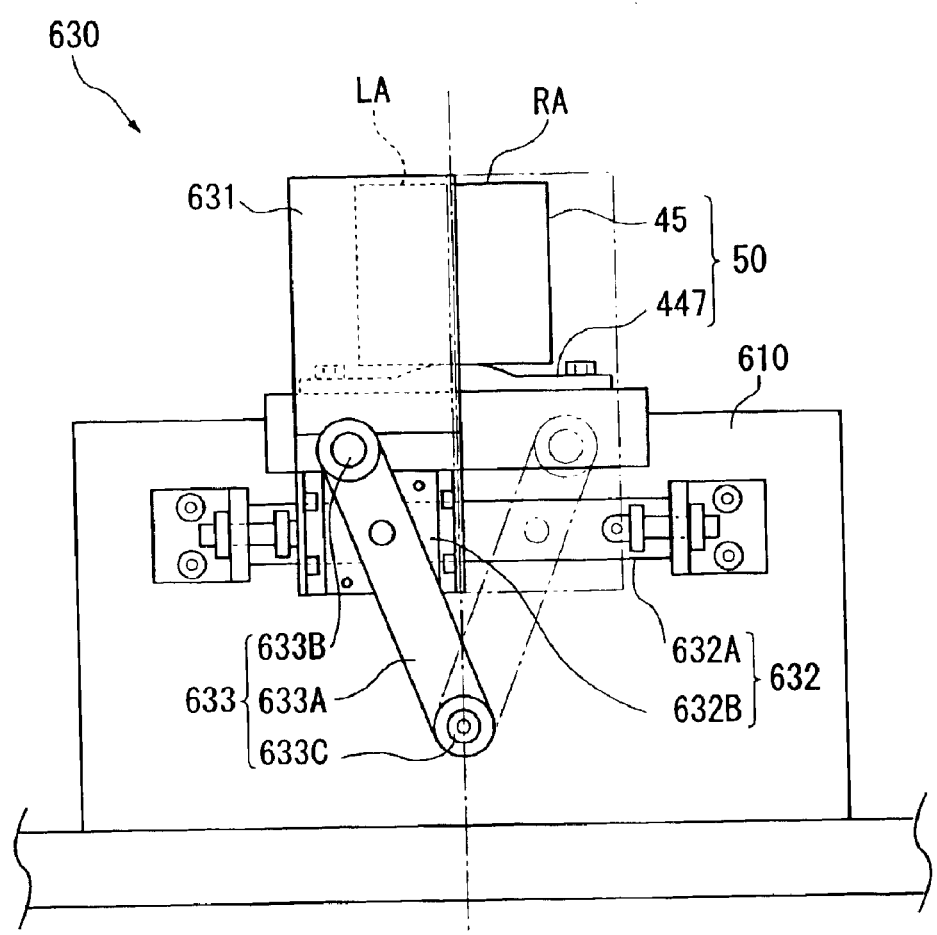
FIG. 13 is a front elevational view showing a switcher of the prism unit manufacturing apparatus.
Figure 14:
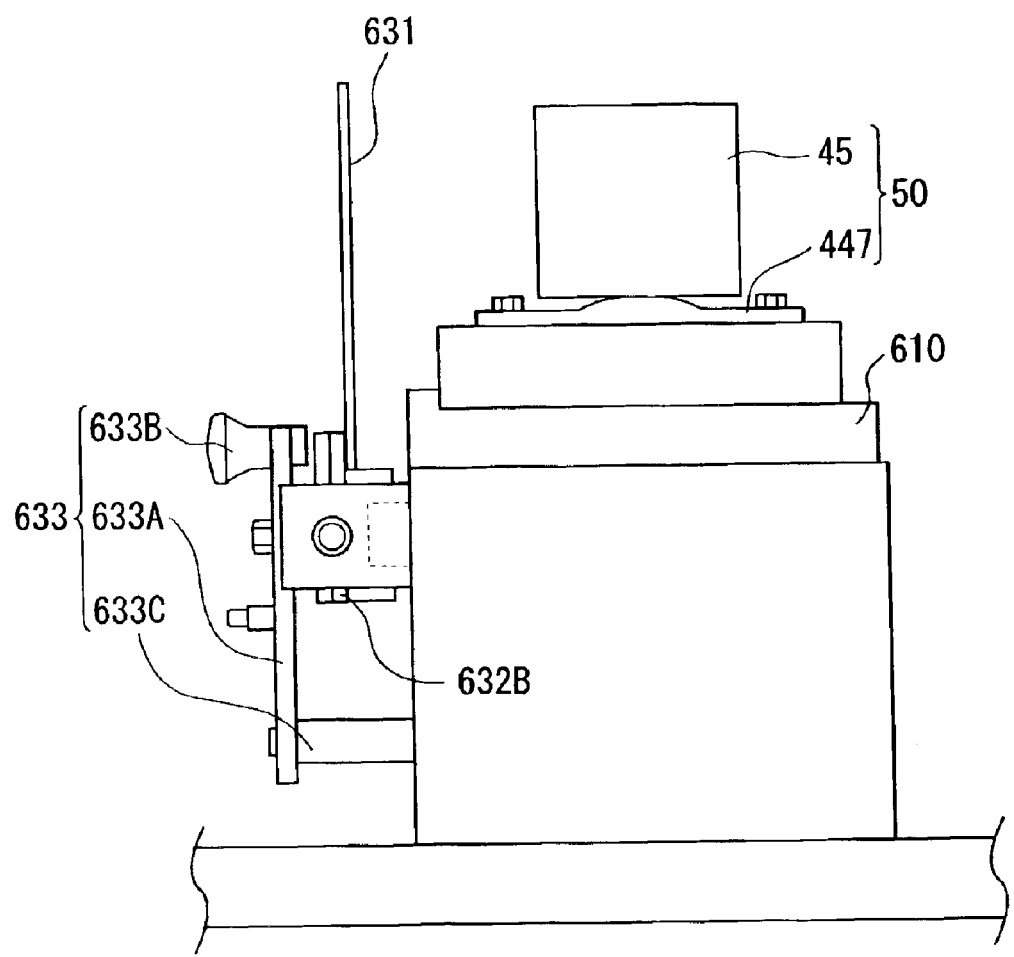
FIG. 14 is a side elevational view showing the switcher.

FIG. 13 is a front elevational view showing the switcher 630 and FIG. 14 is a side elevational view showing the switcher 630.

As also shown in FIG. 3, the switcher 630 is a device for introducing the measurement light X into only one of two areas of left area LA and right area RA divided by the intersecting line 520 of the cross dichroic prism 45 seen from the introducing direction of the measurement light X irradiated from the autocollimator 620, in other words, a device not to introduce the measurement light on other one of the areas LA and RA.

As shown in FIGS. 13 and 14, the switcher 630 is provided on the front side of the base 610, which includes a metal rectangular light shield 631 for shielding the measurement 10 fight X, a slider 632 fixed on the lower side of the light shield 631 and slidable in right and left direction relative to the base 610, and an operating portion 633 fixed on the front side of the slider 632.

As shown in FIG. 14, the slider 632 has a rail 632A provided on the front side of the base 610 and extending in right and left direction, and a slider body 632B fixed on the lower side of the light shield 631 and is slidable along the rail 632A. When the light shield 631 is provided, the slider 632 covers only one of the left area LA and the right area RA of the cross dichroic prism 45 with the light shield 631.

The operating portion 633 has an elongated operating portion body 633A screwed to the front side of the slider body 632B, a handle 633B fixed on the upper end of the operating portion body 633A, and a shaft 633C fixed on the lower end of the operating portion body 633A and the front side of the base 610. The handle 633B is rotatable around the shaft 633C.

Since the slider body 632B slides in right and left direction along the rail 632A in accordance with the rotation of the handle 633B, the light shield 631 fixed on the slider body 632B also moves in right and left direction, so that only one of the left area LA and the right area RA of the cross dichroic prism 45 can be covered by operating the handle 633B.

The reflecting device 640 reflects the measurement light X introduced to the cross dichroic prism 45 from the autocollimator 620 and reflected by the red-color reflection surface 500 to return the light to the autocollimator 620 as the returned light Y. As shown in FIG. 7, the reflecting device 640 has a rectangular reflection mirror 641 opposite to the incident side 45R of the cross dichroic prism 45, and a biaxial adjuster 643 for adjusting horizontal rotary direction and vertical inclination of the reflection mirror 641 by controlling drive of the motor etc. of the drive body through a support plate 642 supporting the reflection mirror 641.

The reflecting device 650 reflects the measurement light X introduced to the cross dichroic prism 45 from the autocollimator 620 and reflected by the blue-color reflection surface 510 to return the light to the autocollimator 620 as the returned light Y. As shown in FIG. 7, the reflecting device 650 has a reflection mirror 651 opposite to the incident side 45B of the cross dichroic prism 45, a support plate 652 supporting the reflection mirror 651 on the right side thereof and having an opening 652A (FIG. 8) at a position corresponding to the intersecting line 520 of the cross dichroic prism 45, and a biaxial adjuster 653 for adjusting horizontal rotary direction and vertical inclination of the reflection mirror 651 by adjusting three-dimensional position of the support plate 652 by controlling drive of the motor etc. of the drive body. The reflection mirrors 641 and 651 are the same components and the biaxial adjusters 643 and 653 are also the same components.

The depth-measuring CCD camera 660 detects the intersecting line 520 of the cross dichroic prism 45 from the right side (rear side) of the reflecting device 650 and is electrically connected with the computer 680. As shown in FIGS. 7 and 8, the depth-measuring CCD camera 660 has a CCD camera body 661 as an intersecting line image pickup for imaging the intersecting line 520 and a predetermined micrometer 662 for supporting the CCD camera body 661 in a manner movable in depth and lateral directions.

The lateral measuring CCD camera 670 detects the intersecting line 520 of the cross dichroic prism 45 from the rear side of the cross dichroic prism 45, which is arranged in the same manner as the depth-measuring CCD camera 660. The lateral measuring CCD camera 670 is movable in lateral (right and left) direction and depth (front and back) direction by a micrometer 672.

Accordingly, the focus adjustment and reference position setting of the image of the intersecting line imaged by the CCD cameras 660 and 670 can be conducted by adjusting the position of the CCD camera bodies 661 and 671 in depth and lateral direction with the micrometers 662 and 672.

The computer 680 processes the image of the intersecting line of the cross dichroic prism 45 detected by the two CCD cameras 660 and 670 and judges bonding condition of the four reflection surfaces 501, 502, 511 and 512, which has a body 681 having a CPU and a storage for executing various programs and a monitor 682 for displaying the result processed and judged by the body 681 as shown in FIG. 7.

Figure 15:
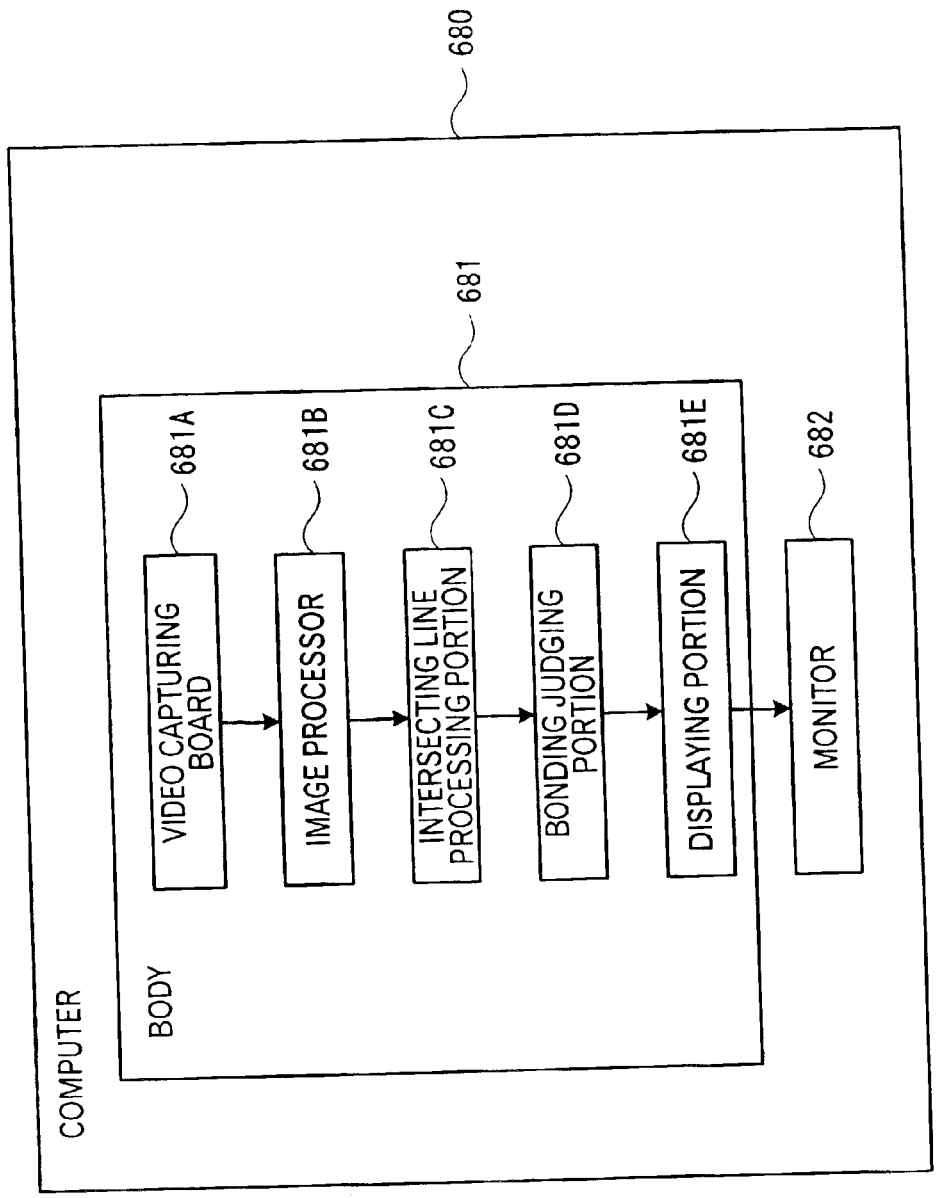
FIG. 15 is a block diagram showing a computer of the aforesaid embodiment.

As shown in FIG. 15, the body 681 has a video capturing board 681A for converting the image of the intersecting line 520 detected by the two CCD cameras 660 and 670 into an image signal for computer, an image processor 681B as a reference position image processor for processing the converted image signal, an intersecting line processing section 681C for calculating the width of the processed intersecting line image and the inclination relative to the reference axis, a bonding judging section 681D for judging quality based on the calculation result, and a displaying section 681E for displaying the image of the intersecting line and judgment result processed respectively by the CCD cameras 660 and 670 on the monitor 682. [5. Method for Manufacturing Color Combining Optical System]

Next, the method for manufacturing the prism unit 50 as a color combining optical system will be described below based on FIG. 17 with reference to a schematic view in FIG. 16 etc.

Figure 16:
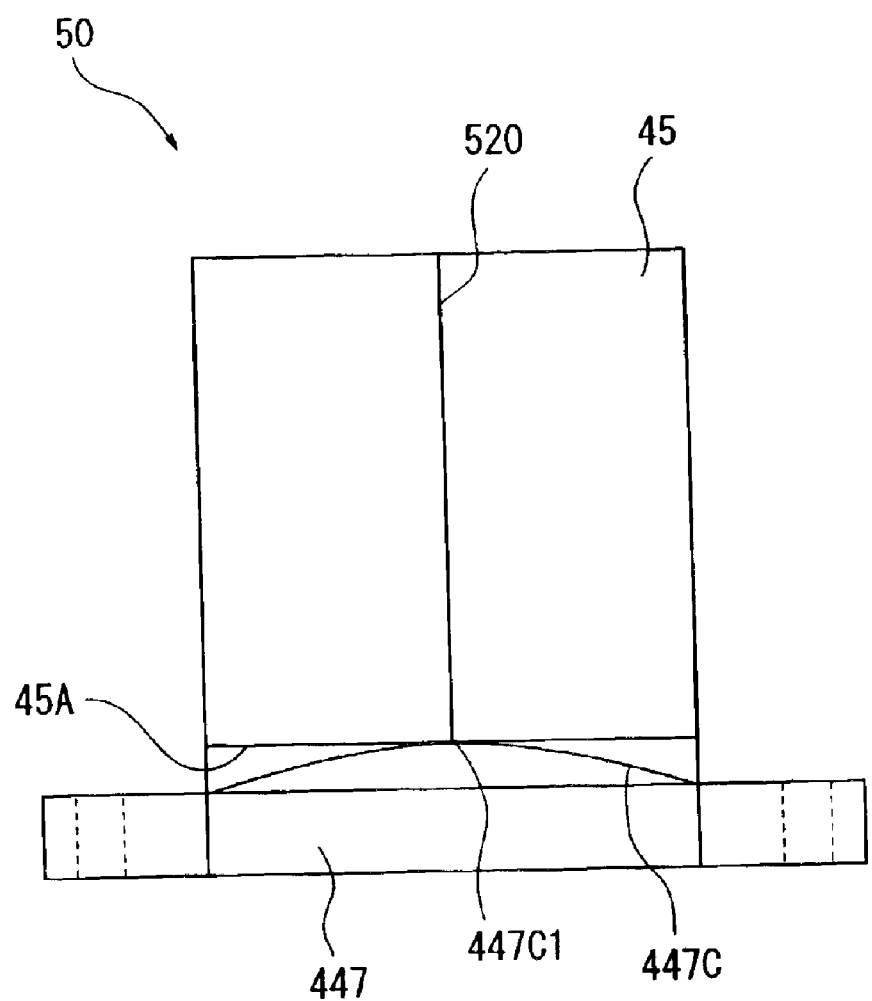
FIG. 16 is a schematic illustration of the prism unit.
Figure 17:
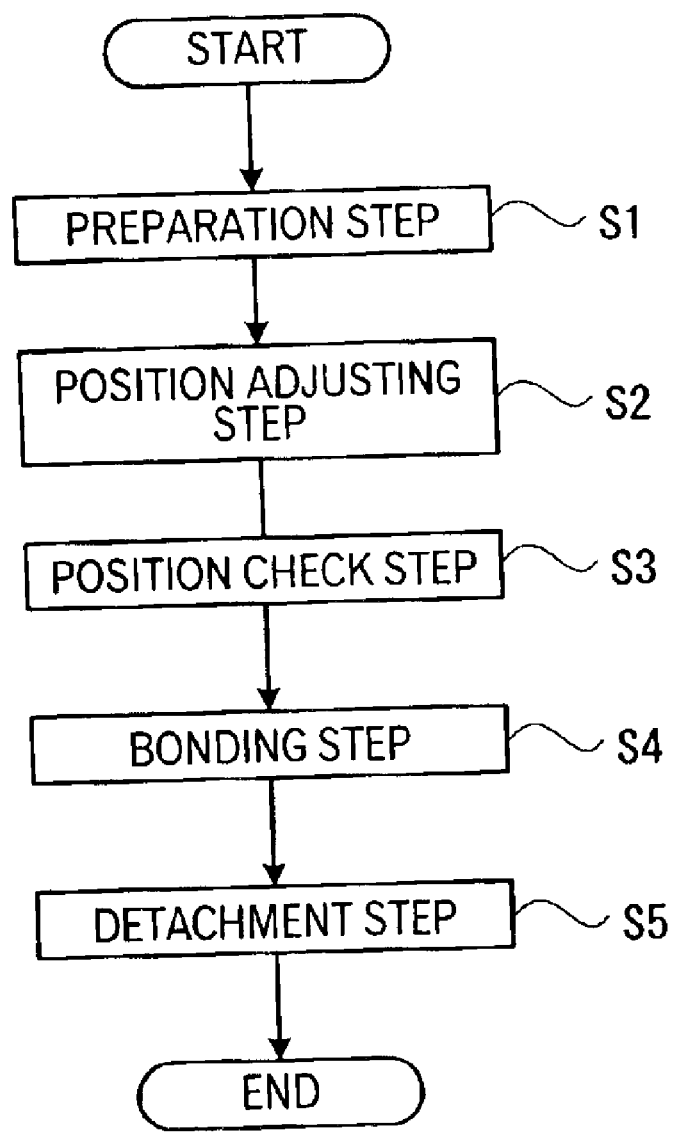
FIG. 17 is a flowchart showing method for manufacturing the prism unit.

Incidentally, at the time of producing the prism unit 50, as shown in FIG. 16, the cross dichroic prism 45 and the fixing plate 447 are bonded in reverse to an arrangement in attaching to the projector 1 to produce the prism unit 50.

[Preparation Step]

Figure 18:
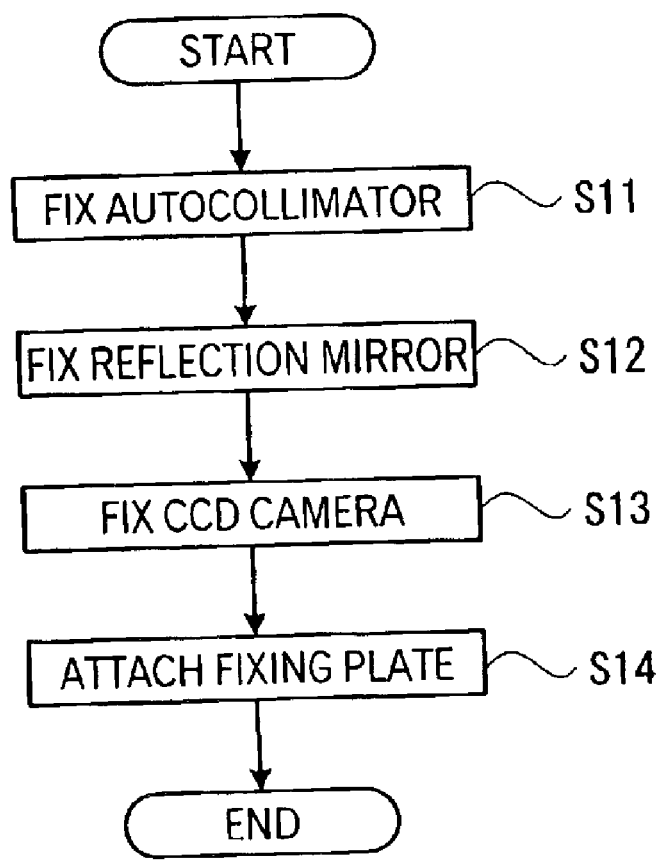
FIG. 18 is a flowchart showing preparation step of the aforesaid embodiment.

Initially, as a preparation step, the position of the respective components of the prism unit manufacturing apparatus 600 is adjusted (step S1). The adjustment is conducted according to the flowchart shown in FIG. 18. Initially, the position of the autocollimator 620 is set and fixed (step S11).

Though not illustrated, a reference mirror block having a mirror surface is prepared and is put on the base 610 so that the mirror surface faces to the autocollimator 620. The measurement light X is irradiated from the autocollimator 620 and the returned light Y reflected by the mirror surface is detected so that the images of the position indicating the measurement light X and the position indicating the returned light Y are aligned to adjust and fix the position of the autocollimator 620.

Next, the position of the reflection mirrors 641 and 651 of the reflecting devices 640 and 650 is fixed (step S12).

Though not illustrated, a dummy triangle prism of roughly right triangle having mirror surface on the oblique side thereof is disposed on the base 610 so that the mirror surface comes to the position of the red-color reflection surface 500. The measurement light X is irradiated from the autocollimator 620 and the returned light Y reflected by the mirror surface and the reflection mirror 641 and reflected again by the mirror surface is detected to align the images of the position indicating the measurement light X and the position indicating the returned light Y, and the position of the reflection mirror 641 is adjusted by the biaxial adjuster 643 to be fixed. In the same manner, the dummy triangle prism is disposed so that the mirror surface thereof comes to the position of the blue-color reflection surface 510 and the position of the reflection mirror 651 is adjusted by the biaxial adjuster 653 to be fixed.

Next, the position of the two CCD cameras 660 and 670 is fixed (step S13).

Figure 19:
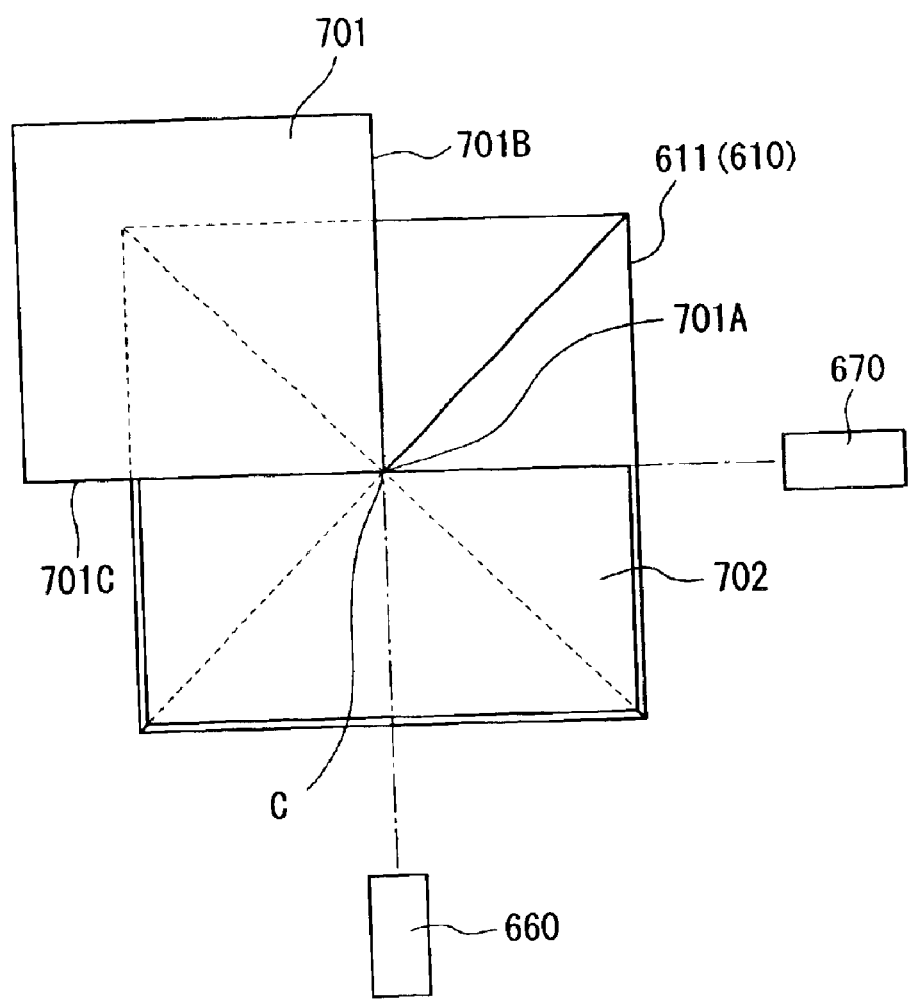
FIG. 19 is an illustration showing adjustment step of the CCD camera of the aforesaid embodiment.

Specifically, as shown in FIG. 19, an edge detecting block 701 of roughly rectangular parallelepiped metal or glass and a dummy glass 702 of rectangular parallelepiped having half the thickness of the cross dichroic prism 45 are prepared.

Next, the block 701 is disposed on the base 610 so that vertex 701A of the block 701 comes to center C and edge 701B of the block 701 is accurately located in depth and lateral direction. Further, a dummy glass 702 for preventing focus shift caused by difference of the refractive index between the glass and air is provided between the block 701 and the depth-measuring CCD camera 660 vertically relative to the optical axis of the depth-measuring CCD camera 660. In this condition, the edge 701B of the block 701 is imaged by the depth-measuring CCD camera 660 and the depth-measuring CCD camera 660 is advanced and retracted in the direction of the dummy glass 702 (vertical direction in the figure) to adjust the focus of the imported image. Thereafter, the position of the depth-measuring CCD camera 660 is adjusted in lateral direction in the figure so that image of the edge 701B of the block 701 is aligned with the reference position showing the center C.

Next, the dummy glass 702 is interposed between the block 701 and the lateral measuring CCD camera 670 vertically relative to the optical axis of the lateral measuring CCD camera 670 while keeping the position of the block 701. In this condition, the edge 701C of the block 701 is imaged by the lateral measuring CCD camera 670 and the lateral measuring CCD camera 670 is advanced and retracted in the direction of the dummy glass 702 (right and left direction in the figure) to adjust the focus of the imported image.

Subsequently, the position of the lateral measuring CCD camera 670 is adjusted in vertical direction in the figure so that the image of the edge 701B of the block 701 becomes coincident with the reference position indicating the center C. The position of the two CCD cameras 660 and 670 is adjusted and fixed as described above.

Thereafter, the fixing plate 447 is screwed to the base 610 (step S14). The preparation step is completed as described above.

[Position Adjusting Step]

Figure 20:
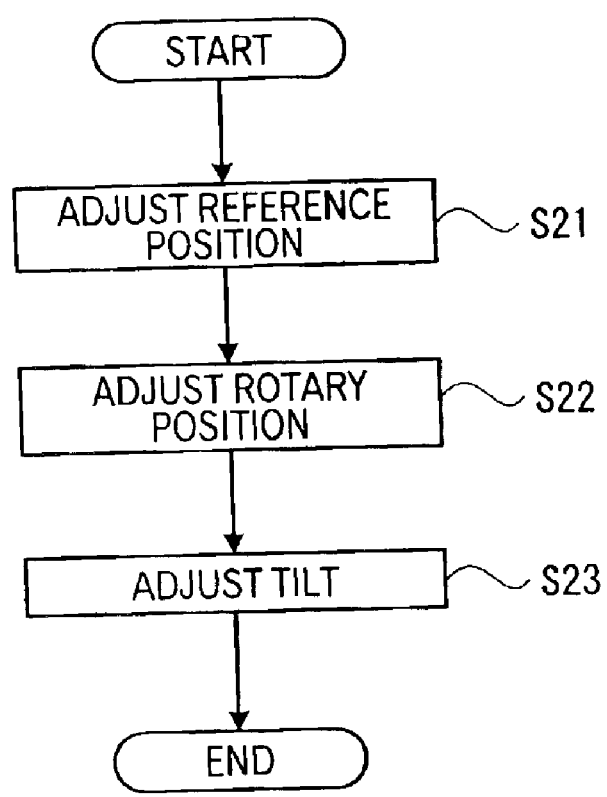
FIG. 20 is a flowchart showing position adjusting step of the aforesaid embodiment.

Next, the three-dimensional position of the cross dichroic prism 45 relative to the fixing plate 447 fixed to the base 610 is adjusted (step S2). Specifically, the adjusting step is conducted according to the flowchart shown in FIG. 20.

The planar position of the cross dichroic prism 45 relative to bonding surface of the fixing plate 447 is adjusted (step S21: reference position adjusting step).

Initially, non-illustrated fluid ultraviolet curing adhesive is coated on the adhesion surface of the fixing plate 447. In this condition, a side of the cross dichroic prism 45 is held by vacuum suction of the prism holder 321 and the cross dichroic prism 45 is brought into contact with the fixing plate 447 by driving the vertical adjuster 324F.

Next, the image of the intersecting line 520 is taken from the rear side and right side of the cross dichroic prism 45 by the depth-measuring CCD camera 660 and the lateral measuring CCD camera 670 and the image is imported by the video capturing board 681A and processed by the image processor 681B to accurately align the reference point 447C1 with an end of the fixing plate 447 of the intersecting line image 520. Accordingly, the position of the intersecting line 520 relative to the fixing plate 447, i.e. the planar position of the cross dichroic prism 45 relative to the fixing plate 447 seen from above is set.

Figure 21:
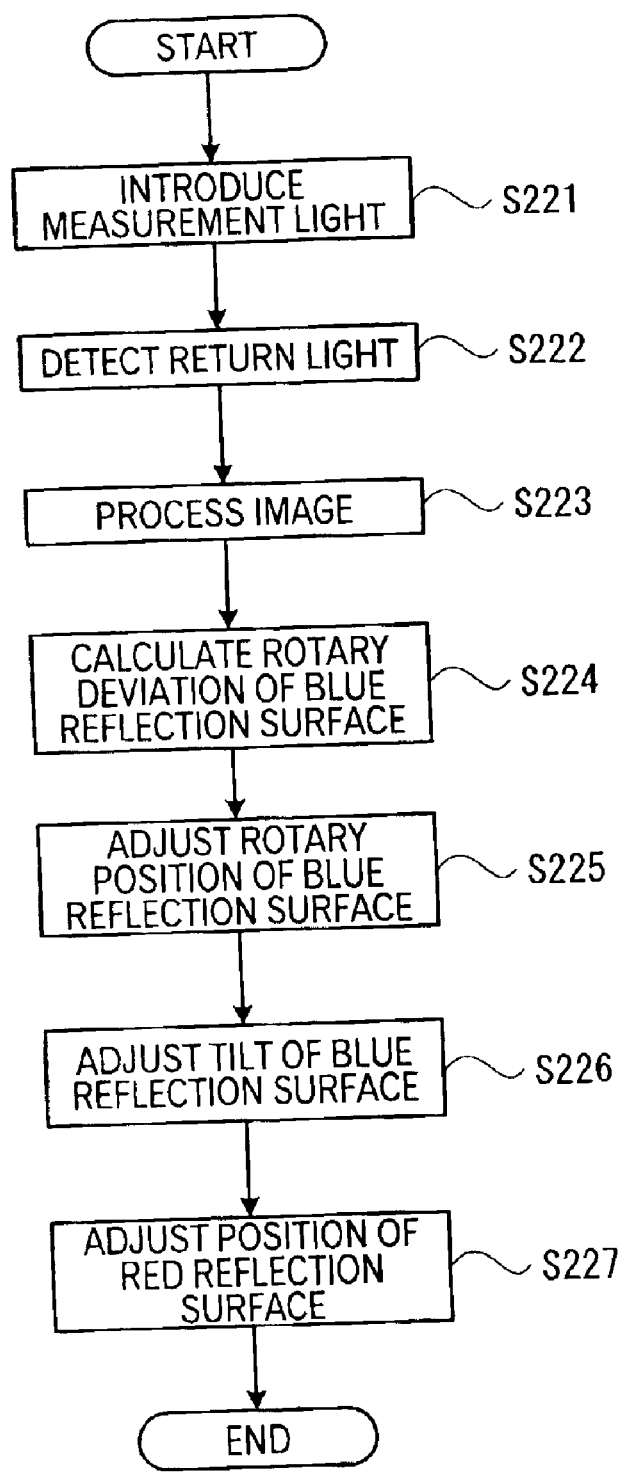
FIG. 21 is a flowchart more specifically showing the position adjusting step.

Next, the rotary position of the respective reflection surfaces 502 and 512 relative to the adhesion surface of the fixing plate 447 is adjusted around the intersecting line 520 of which position is adjusted (step S22: rotary position adjusting step). Further, tilt of the reflection surfaces 502 and 512 relative to the adhesion surface of the fixing plate 447 is adjusted approximately simultaneously (step S23: tilt adjusting step), which is specifically conducted according to the flowchart shown in FIG. 21.

Initially, the measurement light X is introduced to the side 45E of the cross dichroic prism 45 at an incident angle of approximately forty-five degrees from the autocollimator 620 while the left area LA is shielded by the light shield 631 (step S221: measurement light introducing step).

At this time, the introduced measurement light X becomes blue measurement light XB after being reflected by the blue reflection surface 512 and becomes returned light YB after being reflected by the reflection mirror 651, the returned light YB being irradiated from the side 45E after being reflected by the blue reflection surface 512 to return to the autocollimator 620. The position of the returned light YB is detected by the image pickup device 627B of the 3-CCD camera 625 (step S222: returned light detecting step).

Next, the image of the detected returned light YB is imported by the video capturing board 628A as a detection signal, the detection signal is processed by the image processor 628B (step S223). At this time, the processed image is displayed on a display D (FIG. 22) and is stored in a memory etc. in the computer 700.

Figure 22:
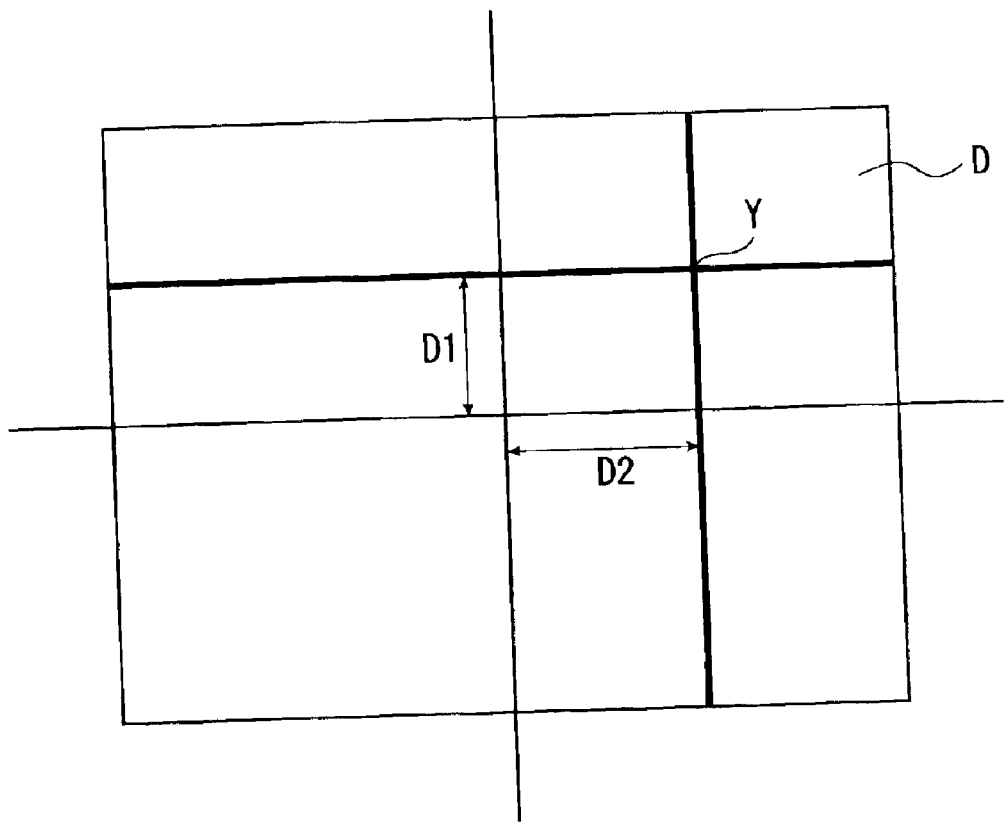
FIG. 22 is an illustration showing returned light on the display of the aforesaid embodiment.
Figure 23:
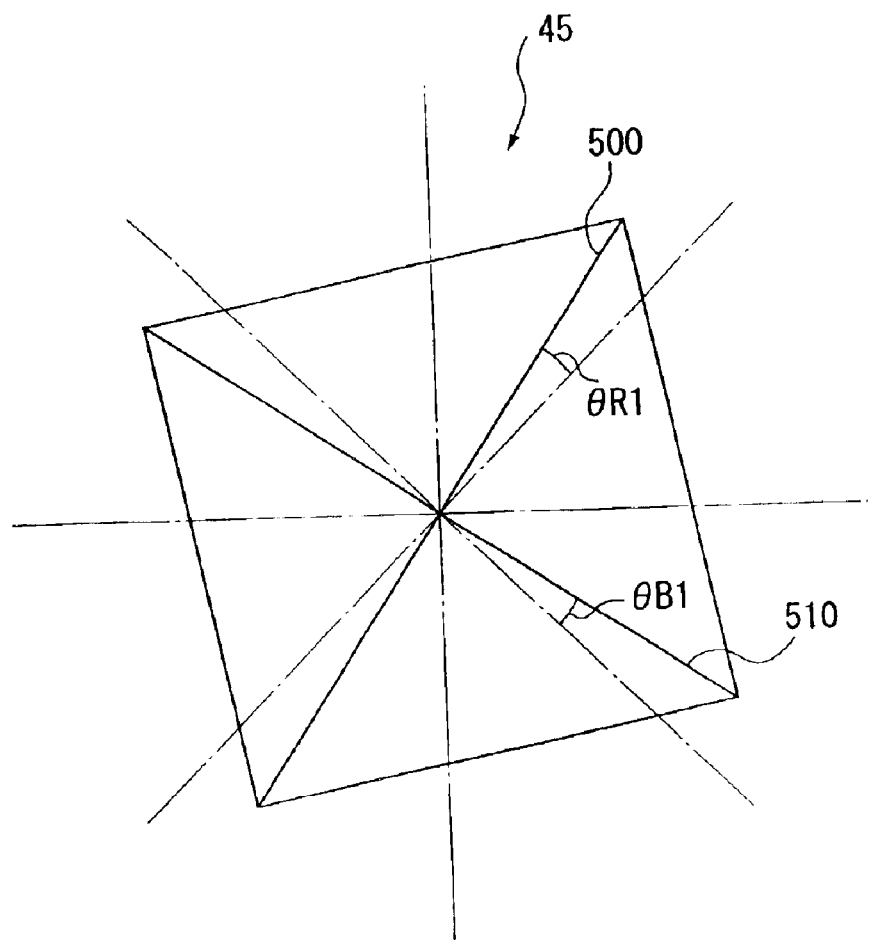
FIG. 23 is an illustration showing deviation of the reflection surface of the cross dichroic prism.

Next, in a deviation obtaining section 629D, the deviation between the reference position as a predetermined designed position of the measurement light X and the position of the returned light Y on the processed image, specifically, a deviation D2 in right and left direction on the display D shown in FIG. 22 is obtained based on the image processing result at the image processor 628B, and a rotary deviation θB1 of the blue reflection surface 512 relative to the reference position is calculated based on the deviation D2 as shown in FIG. 23 and the calculated result is outputted to the position adjuster 690 (step S224).

Accordingly, the position adjuster 690 adjusts the rotary position of the blue reflection surface 512 of the cross dichroic prism 45 by driving the in-plane rotary position adjuster 326 so that the rotary deviation OBI becomes substantially zero (step S225: reflection surface rotary position adjusting step).

Figure 24:
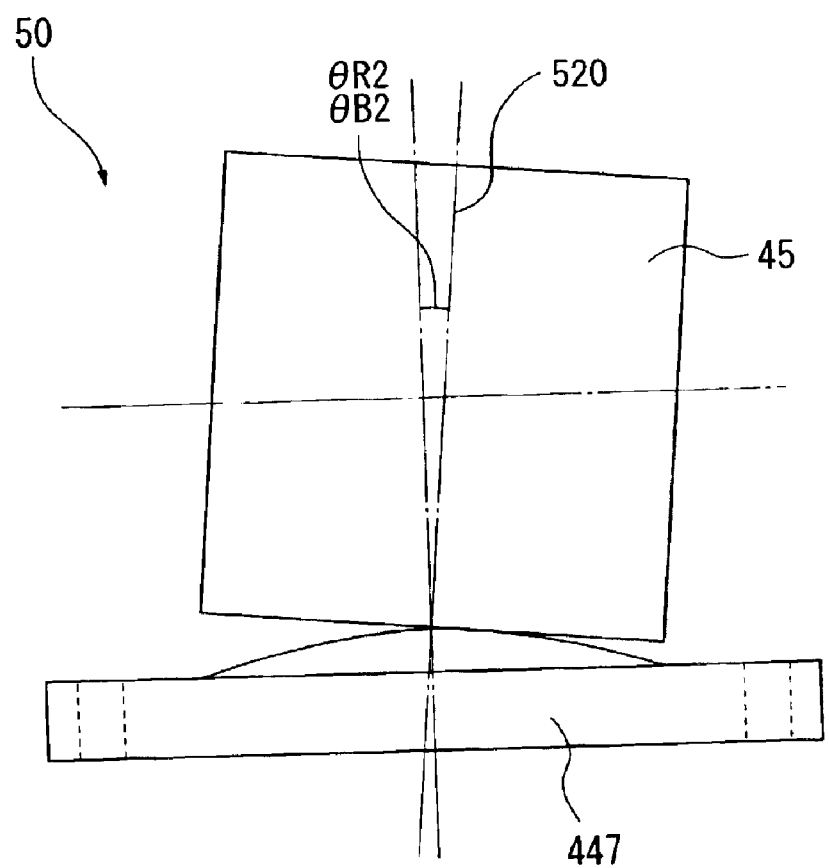
FIG. 24 is an illustration showing a deviation of the reflection surface of the cross dichroic prism.

In the same manner, the tilt θB2 relative to the reference position, i.e. the tilt amount relative to the illumination optical axis is calculated based on the deviation D1 obtained by the deviation obtaining section 628D as shown in FIG. 24, and the position adjuster 690 adjusts the tilt of the blue reflection surface 512 of the cross dichroic prism 45 by driving the out-plane rotary position adjuster 325 so that the tilt θB2 becomes substantially zero based on the calculation result (step S226: reflection surface tilt adjusting step).

Figure 25:
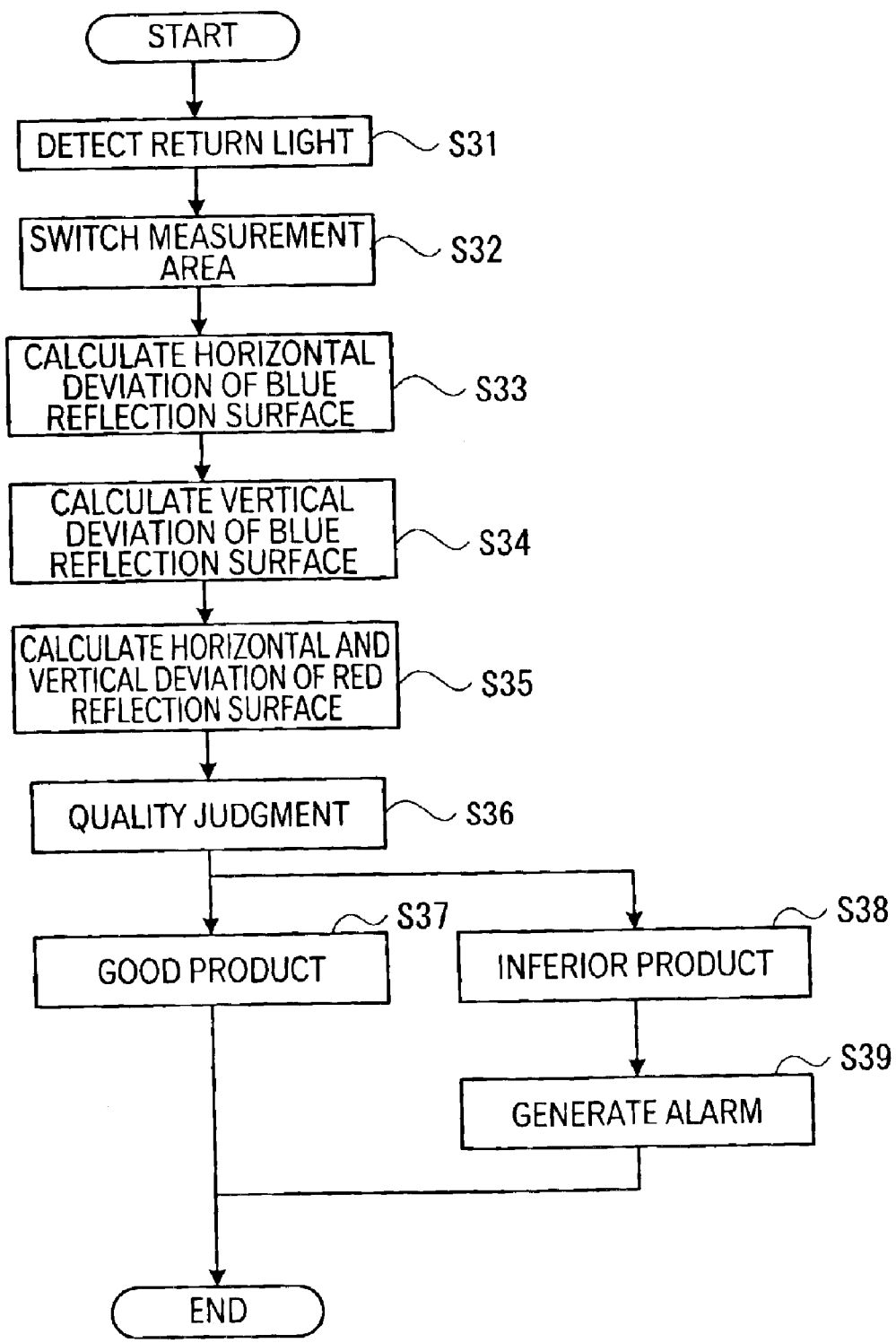
FIG. 25 is a flowchart showing position check step of the aforesaid embodiment.

In the same manner, the measurement light X is irradiated from the autocollimator 620, red-color returned light YR reflected by the red-color reflection surface 502 and the reflection mirror 641 is detected by the image pickup device 627R of the 3-CCD camera 625, the rotary deviation θR1 and the tilt θR2 shown in FIGS. 24 and 25 are calculated, and the position adjuster 690 adjusts the rotary position and tilt of the red-color reflection surface 502 of the cross dichroic prism 45 (step S227).

Incidentally, the acceptable range of the rotary deviation θB1, θR1 and the tilt θB2 and θR2 is set as ±5 second, and adjustment process is conducted so that the deviation and tilt fall within the range.

The adjustment process is conducted according to the above-described steps based on the reference surfaces 502 and 512 of the right area RA of the cross dichroic prism 45.

[Position Checking Step]

Next, the relative position of the respective reflection surfaces 501, 502, 511 and 512 of the cross dichroic prism 45 of the color combining optical system 50 is checked with the light shield 631 being set (step S3). Specifically, the process is conducted based on the flowchart shown in FIG. 25.

The measurement light X is irradiated on the right area RA from the autocollimator 620 and the returned light Y reflected by the reflection mirrors 641 and 651 is detected by 3-CCD camera 625 (step S31: measurement light introducing step, returned light detecting step). More specifically, the blue light XB of the measurement light X is reflected by the reflection mirror 651 to become the blue returned light YB after being reflected by the blue reflection surface 510, and is reflected again by the blue reflection surface 510 to return to the autocollimator 620. Subsequently, the position of the blue returned light YB is detected by the image pickup device 627B of the 3-CCD camera 625, and the detection signal is imported by the video capturing board 628A so that the detection signal is processed by the image processor 628B. The processed image is displayed on the display D and is stored on the memory in the computer. On the other hand, in the same manner with the blue light, the red light XR of the measurement light X is also reflected by the reflection mirror 641 to become the red returned light YR after being reflected by the red reflection surface 502, and is reflected again by the red reflection surface 502 to return to the autocollimator 620. Subsequently, the position of the red returned light YR is detected by the image pickup device 627R of the 3-CCD camera 625, and the detection signal is imported by the video capturing board 628A so that the detection signal is processed by the image processor 628B. The processed image is displayed on the display D and is stored on the memory in the computer.

Next, while the right area RA is covered with the light shield 631 the measurement light X is irradiated on the left area LA by operating the handle 633B of the switcher 630 and the blue returned light YB reflected by the reflection mirror 651 and the red returned light YR reflected by the reflection mirror 641 are detected by the 3-CCD camera 625 (step S32: measurement light switching step).

Figure 26:
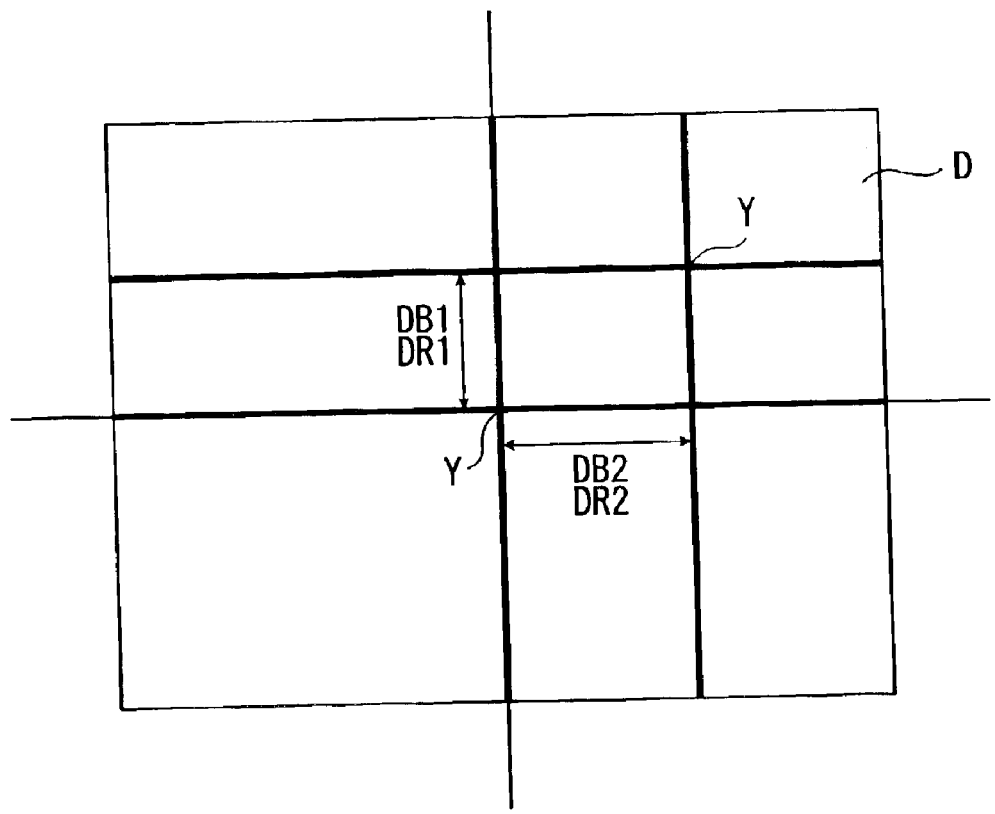
FIG. 26 is an illustration of the returned light of the respective reflection surfaces on the display of the aforesaid embodiment.

FIG. 26 shows detection result when the blue reflection surface 512 of the right area RA and the blue reflection surface 511 of the left area LA are shifted. The angle sensor 628C calculates horizontal deviation PB of the blue reflection surface 511 of the left area LA relative to the blue reflection surface 512 of the right area RA, i.e. deviation (angle) from extending direction of the reference surfaces 511 and 512, based on the vertical deviation DB1 as shown in FIG. 27 (step S33).

Next, based on the lateral (right and left direction) deviation DB2 shown in FIG. 26, vertical deviation QB (not shown) as an angle of the blue reflection surface 511 of the left area LA relative to the blue reflection surface 512 of the right area RA is calculated (step 15. S34).

Figure 27:
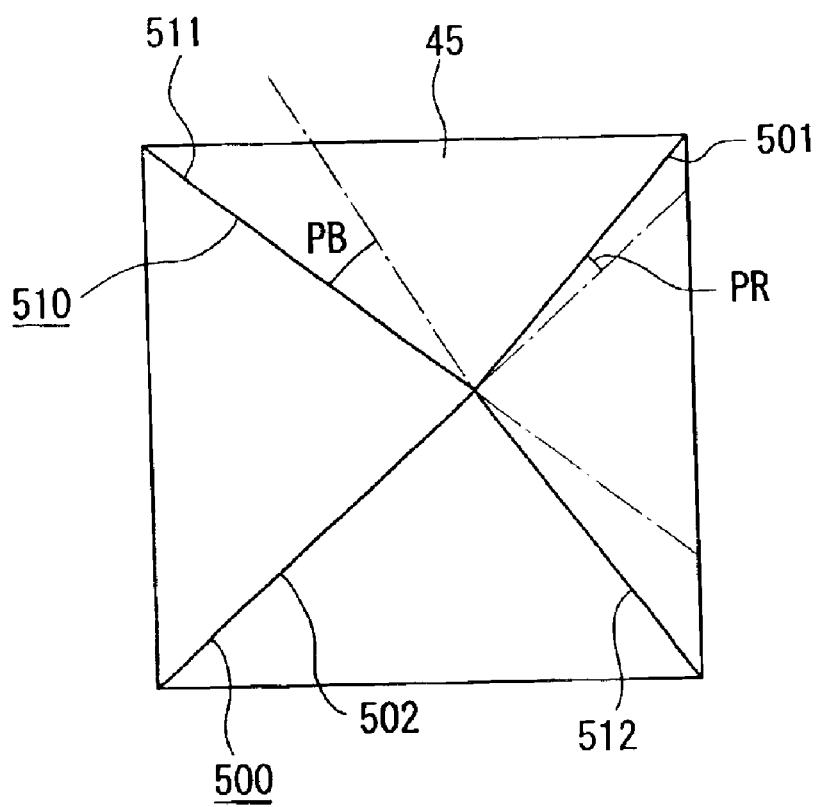
FIG. 27 is an illustration showing deviation between the reflection surfaces of the cross dichroic prism.

In the same manner as the blue light, the angle sensor 628C calculates the horizontal deviation PR and the vertical deviation QR (not shown) of the red reflection surface 501 relative to the red reflection surface 502 shown in FIG. 27 based on the deviations DR1 and DR2 of the red reflection surface 502 of the right area RA and the red reflection surface 501 of the left area LA as shown in FIG. 26 (step S35).

The quality judging section 628E judges whether the calculated horizontal deviations PB and PR and the vertical deviations QB and QR are within a predetermined standard value range (step S36: judging step). When the horizontal deviations PB and PR and the vertical deviations QB and QR prove to be within the standard value range, the product is determined as conforming article (step S37). On the other hand, when the horizontal deviations PB and PR and the vertical deviations QB and QR are judged to be the non-standard value range, the product is judged defective (step S38) and an alarm is generated from the alarm generator 628F (step S39).

Incidentally, the conforming article range of the horizontal deviations PB and PR and the vertical deviations QB and QR is ±5 second.

Next, contact condition as relative position between the fixing plate 447 and the cross dichroic prism 45 which is adjusted during the reference position adjusting step is checked.

Figure 28:
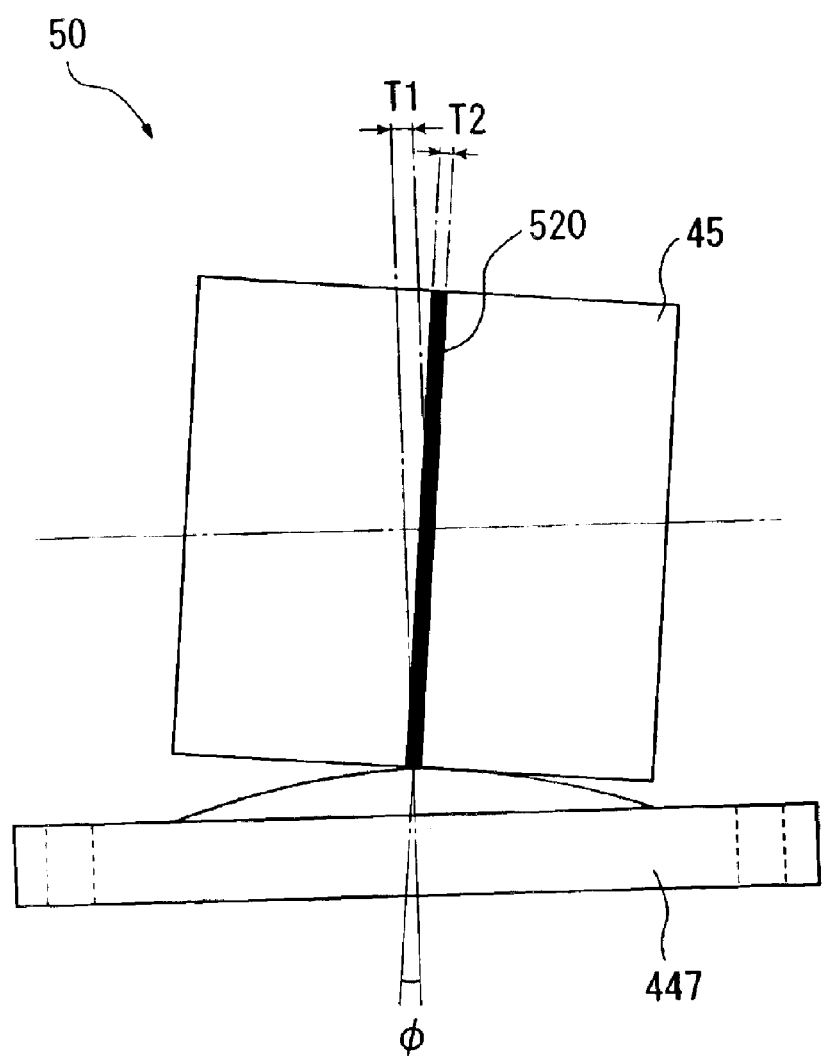
FIG. 28 is an illustration showing bonding of the reflection surfaces of the cross dichroic prism.

Initially, the image of the intersecting line 520 is taken by the CCD camera body 661 of the depth-measuring CCD camera 660. Based on the intersecting line 520 of which image is taken and processed, depth deviation T1 of the intersecting line 520 relative to the reference line, width T2 of the intersecting line 520 and inclination φ relative to the reference line is calculated in an intersecting line processing section 681C as shown in FIG. 28. Since the width 12 of the intersecting line 520 is measured, when the width T2 of the intersecting line 520 is greater than the reference, it is confirmed that parallel movement shift is caused between the two extending reflection surfaces 501 and 502, and 511 and 512.

In the same manner as the above, the lateral deviation T1 of the intersecting line 520 relative to the reference line, the width T2 of the intersecting line 520 and the inclination φ relative to the reference line are calculated by taking the image of the intersecting line 520 by the CCD camera body 671 of the lateral measuring CCD camera 670.

Next, whether all of the measured respective deviations T1, T2 and φ are within the conforming article range or not is determined by the bonding judging section 681D. It is determined that a product is good when the deviations are within the range and it is determined that a product is defective when the deviations are outside the range. Incidentally, the conforming article range of the depth deviation T1 is ±0.05 mm. Further, the conforming article range of the width T2 and the inclination φ is set appropriately.

[Bonding Process]

Next, ultraviolet is irradiated on the ultraviolet curing adhesive from the upper side of the cross dichroic prism 45 of which position is adjusted to cure the ultraviolet curing adhesive thereby bonding the cross dichroic prism 45 on the fixing plate 447 (step S4: bonding step).

The prism unit 50 is produced as in the above and is detached from the base 610, thereby completing all the steps (step S55).

[6. Advantages]

According to the present embodiment, following advantages can be obtained.
(1) Since the rotary position of the cross dichroic prism 45 relative to the fixing plate 447 can be adjusted while adjusting the position of the cross dichroic prism 45 relative to the reference point 447C1 of the fixing plate 447 and the tilt of the reflection surfaces 501, 502, 511 and 512 of the cross dichroic prism 45 can be adjusted, the attachment accuracy of the cross dichroic prism 45 relative to the fixing plate 447 can be improved. Accordingly, the quality of the prism unit 50 becomes less uneven and the prism unit 50 can be efficiently produced by restraining production cost.
(2) Since the measuring CCD cameras 660 and 670, the video capturing board 681A and the image processor 681B are used for adjusting the reference position, the intersecting line 520 can be accurately and automatically adjusted to the reference point 447C1 of the fixing plate 447, thus further improving the attachment accuracy of the cross dichroic prism 45 relative to the fixing plate 447.

(3) Since the rotary position and tilt of the cross dichroic prism 45 is automatically adjusted by introducing the measurement light X from the autocollimator 620 and detecting the returned light Y thereof, the rotary position and tilt of the reflection surfaces 501, 502, 511 and 512 can be securely and easily adjusted by eliminating the horizontal and vertical deviations between the positions of the measurement light X and the returned light Y.

(4) Since the 3-CCD camera 625, the video capturing board 628A and the image processor 628B are used for adjusting the rotary position and the tilt of the reflection surfaces 501, 502, 511 and 512 of the cross dichroic prism 45, the returned light Y can be accurately and automatically detected, so that the attachment process can be accelerated and facilitated as well as improving the attachment accuracy of the cross dichroic prism 45.

(5) Since whether the angle differences PR, PB, QR and QB of the reflection surfaces 501, 502, 511 and 512 obtained by the angle sensor 628C are within the standard value range or not is checked by the quality judging section 628E and those within the standard value range are selected as conforming articles, a prism unit 50 which is highly accurately produced can be automatically selected.

(6) Since the alarm is generated by the alarm generator 628F when the defective is determined by the quality judging section 628E, the manufacturer can immediately recognize the presence of the defective, thereby securely preventing the defective from being mixed with the conforming article.

(7) Since the measurement light X is only entered on the right area RA and the returned light Y is detected in adjusting the rotary position and tilt, only one returned light Y is detected even when there is minute shift between the reflection surfaces 501, 502 and 511, 512 along the extending direction, so that the position of the cross dichroic prism 45 relative to the fixing plate 447 can be adjusted with high accuracy.

(8) Since the relative position of the reflection surfaces 501, 502, 511 and 512 is checked as well as the position of the reflection surfaces 501, 502, 511 and 512 relative to the fixing plate 447, the product with higher attachment accuracy can be selected before being shipped.

(9) When the relative position of the reflection surfaces 501, 502, 511 and 512 is checked, since the measurement light X is irradiated from the autocollimator 620 and the measurement light X is switchably irradiated on the right area RA and the left area LA of the color reflection surfaces 500 and 510 using the switcher 630, the relative position of the reflection surfaces 501, 502, 511 and 512 of the color reflection surfaces 500 and 510 can be easily checked. Accordingly, the quality checking accuracy of the cross dichroic prism 45 can be improved. Further, defective of the cross dichroic prism 45 can be discriminated before bonding by irradiating ultraviolet and the defective cross dichroic prism 45 is not attached on the fixing plate 447, to eliminate waste.

(10) Since the measurement light introducing section and the returned light detector are integrated as the autocollimator 620, the size of the manufacturing apparatus 600 can be reduced as compared to an arrangement where the measurement light introducing section and the returned light detector are separately provided.

(11) Since the reflection mirrors 641 and 651 are provided on the sides 45R and 45B of the cross dichroic prism 45, bright returned light Y can be securely returned, thereby facilitating detection by the autocollimator 620.

(12) Since the 3-CCD camera 625 is used for detecting the returned light Y, the returned light Y can be automatically and more securely detected than an arrangement for detecting the returned light Y with naked eye, so that the work load on a worker can be reduced.

(13) Since the width T2 of the intersecting line 520 is measured using the CCD cameras 660 and 670, even when the two reflection surfaces 501, 502 and 511, 512 of the respective reflection surfaces 500 and 510 are shifted in parallel, the deviation of the parallel movement can be easily checked. Further, since the inclination $\phi$ of the intersecting line 520 is measured by the CCD cameras 660 and 670, even when the two reflection surfaces 501, 502 and 511, 512 of the respective reflection surfaces 500 and 510 are inclined relative to a reference axis perpendicular to the optical axis of the measurement light X, the inclination $\phi$ can be easily checked. Simultaneously, the deviation T1 in depth (front and back) direction and lateral (right and left) direction can be easily checked. At this time, the acceptable range of the deviation T1, width T2 and the inclination $\phi$ is predetermined, automatic check can be easily conducted and those having higher attachment accuracy can be selected.

(14) Since the light shield 631 can be switched by relatively simple arrangement of operating the handle 663B of the switcher 630, the production cost of the switcher 630 can be reduced.

(15) The method for manufacturing the projector 1 includes the method for manufacturing the above-described prism unit 50. Accordingly, the respective color lights can be combined by the cross dichroic prism 45, thereby allowing the projector 1 to project vivid optical image.

[7. Modifications]

Incidentally, the scope of the present invention is not restricted to the above-described embodiments, but includes other arrangement as long as an object of the present invention can be achieved, which includes following modifications.

For instance, though the reflecting devices 640 and 650 are located so as to face the sides 45R and 45B of the cross dichroic prism 45 in the above-described embodiment, a reflection mirror may be adhered on the sides 45R and 45B of the cross dichroic prism 45. However, the above embodiment is preferable in that the position of the reflection mirror can be accurately adjusted. Alternatively, the light may be reflected by the respective sides without providing reflection mirror etc.

The autocollimator 620, the CCD cameras 660 and 670, and the position adjuster 690 of the above embodiment may be adjusted manually or automatically. Though the handle 633B of the switcher 630 is manually operated, the switcher 630 may be automatically switched.

Though the 3-CCD camera 625 is provided on the autocollimator 620 in the above embodiment, the light may be detected with a single-plate CCD camera or naked eye. When a single-plate CCD camera is used, the measurement light X may be introduced after being converted into red light or blue light. Alternatively, a plurality of color filters having different colors may be prepared and the returned light Y may be sequentially passed through the color filter to detect the returned light Y by a returned light detector for every color lights.

Though the autocollimator 620 integrating the measurement light introducing section and the returned light detector is used in the above embodiment, the measurement light introducing section and the returned light detector may be independently constructed.

The acceptable range of the cross dichroic prism 45 is not restricted to the above specific values in the above embodiment, which may be changed in accordance with the type and usage of the optical device such as a projector in which the prism is installed.

Though the prism unit produced by the present invention is applied to a front-type projector where the image is projected in a direction of observing a screen, the present invention may be applied to a rear-type projector where the image is projected in a direction opposite to the direction of observing the screen.

The other specific arrangement and structure may be designed in any manner as long as an object of the present invention can be achieved.

What is claimed is:

1. A method for manufacturing a color combining optical system, the color combining optical system having: a color combining optical element that has four reflection surfaces arranged roughly in X-shape to form an incident angle of approximately forty-five degrees seen in a direction orthogonal to an optical axis of a plurality of incident light beams, the four reflection surfaces including one pair of reflection surfaces along one extending direction of the roughly X-shape and the other pair of reflection surfaces along the other extending direction of the roughly X-shape, the one pair of reflection surfaces reflecting a light beam of wavelength different from a light beam reflected by the other pair of reflection surfaces; and a fixing plate that is bonded on a side of the color combining optical element intersecting the reflection surfaces arranged roughly in X-shape, the method comprising:

a reference position adjusting step where a position of an intersecting line of the one pair of reflection surfaces and the other pair of reflection surfaces is adjusted relative to a reference position set on the fixing plate;

a rotary position adjusting step where a rotary position of the reflection surfaces is adjusted relative to the fixing plate around the intersecting line of which position is adjusted;

a tilt adjusting step where a tilt of the reflection surfaces is adjusted relative to a bonding surface of the fixing plate; and a bonding step where the color combining optical element is bonded to the fixing plate after these adjusting steps are completed.

2. The method for manufacturing color combining optical system according to claim 1, wherein the reference position adjusting step is conducted by importing the image of the intersecting line to a computer through an image pickup device and an image importing device and processing the image by the computer.

3. The method for manufacturing color combining optical system according to claim 1, the rotary position adjusting step comprising:

a measurement light introducing step where a measurement light is introduced on one of the reflection surfaces of the color combining optical element at an incident angle of approximately forty-five degrees;

a returned light detecting step where a returned light of the introduced measurement light is detected; and a reflection surface rotary position adjusting step where the rotary position of the one of the reflection surfaces is adjusted based on the detected returned light.

4. The method for manufacturing color combining optical system according to claim 1, the tilt adjusting step comprising:

a measurement light introducing step where a measurement light is introduced on one of the reflection surfaces of the color combining optical element at an incident angle of approximately forty-five degrees;

a returned light detecting step where a returned light of the introduced measurement light is detected; and a reflection surface tilt adjusting step where the tilt of the one of the reflection surfaces is adjusted based on the detected returned light.

5. The method for manufacturing color combining optical system according to claim 4, wherein the rotary position adjusting step and the tilt adjusting step are conducted by importing the returned light to a computer through an image pickup device and an image importing device and processing the image by the computer.

6. The method for manufacturing color combining optical system according to claim 1, further comprising:

a measurement light introducing step where a measurement light is introduced on one reflection surface of the color combining optical element at an incident angle of approximately forty-five degrees;

a returned light detecting step where a returned light of the introduced measurement light is detected;

a measurement light switching step where the measurement light is introduced on the other reflection surface along the extending direction of the one reflection surface; and a quality judging step where a returned light of the switched measurement light is detected to obtain a deviation of the other reflection surface relative to the one reflection surface and judge the quality of the color combining optical element.

7. An apparatus for manufacturing a color combining optical system, the color combining optical system having: a color combining optical element that has four reflection surfaces arranged roughly in X-shape to form an incident angle of approximately forty-five degrees seen in a direction orthogonal to an optical axis of a plurality of incident light beams, the four reflection surfaces including one pair of reflection surfaces along one extending direction of roughly X-shape and the other pair of reflection surfaces along the other extending direction of roughly X-shape, the one pair of reflection surfaces reflecting a light beam having wavelength different from a light beam reflected by the other pair of reflection surfaces; and a fixing plate that is bonded on a side of the color combining optical element intersecting the reflection surfaces arranged roughly in X-shape, the apparatus comprising:

a base to which the fixing plate is attached;

a position adjuster that adjusts the position of the color combining optical element relative to the fixing plate mounted on the base;

a measurement light introducing section that introduces a measurement light on one of the four reflection surfaces at an incident angle of approximately forty-five degrees;

a returned light detector that detects a returned light of the introduced measurement light; and a measurement light switcher that introduces the measurement light on the other reflection surface along the extending direction of the one of the reflection surfaces.

8. The apparatus for manufacturing a color combining optical system according to claim 7, further comprising a reference position image processor that imports an image of an intersecting line of the one pair of reflection surfaces and the other pair of reflection surfaces.

9. The apparatus for manufacturing a color combining optical system according to claim 7, wherein the measurement light introducing section and the returned light detector are integrated as an autocollimator.

10. The apparatus for manufacturing a color combining optical system according to claim 7, further comprising an image processor that imports and processes an image of the returned light taken by an image pickup device connected to the returned light detector through an image importing device.

11. The apparatus for manufacturing a color combining optical system according to claim 10, further comprising:

an angle sensor that measures an angle between the reflection surfaces of one of the pairs of reflection surfaces based on the result of image processing of the returned light reflected by the reflection surfaces of the one of the pairs of reflection surfaces in the image processor; and a quality judging section that determines whether the measured angle is within a range of standard value or not.

12. The apparatus for manufacturing a color combining optical system according to claim 7, further comprising a reflection component that reflects the light beam reflected by the reflection surface to introduce to the returned light detector as the returned light.

13. A method for manufacturing a projector comprising the method for manufacturing the color combining optical system according to claim 1.

* * * * *